US012027128B2

United States Patent
(12) United States Patent
Ma et al.

(10) Patent No.: US 12,027,128 B2
(45) Date of Patent: Jul. 2, 2024

(54) DISPLAY MODULE, METHOD OF DRIVING SAME, AND DISPLAY DEVICE

(71) Applicants: Beijing BOE Optoelectronics Technology Co., Ltd., Beijing (CN); BOE Technology Group Co., Ltd., Beijing (CN)

(72) Inventors: Qing Ma, Beijing (CN); Rui Han, Beijing (CN); Pengtao Li, Beijing (CN); Daekeun Yoon, Beijing (CN); Jie Yu, Beijing (CN); Weining Chi, Beijing (CN); Tianyang Han, Beijing (CN); Jing Yu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/205,710

(22) Filed: Jun. 5, 2023

(65) Prior Publication Data

US 2023/0306920 A1 Sep. 28, 2023

Related U.S. Application Data

(63) Continuation-in-part of application No. 17/569,199, filed on Jan. 5, 2022, now Pat. No. 11,703,712.

(30) Foreign Application Priority Data

Jan. 28, 2021 (CN) ......................... 202110120983.2
May 30, 2023 (CN) ......................... 202321349870.0

(51) Int. Cl.
*G09G 3/34* (2006.01)

(52) U.S. Cl.
CPC ......... *G09G 3/3426* (2013.01); *G09G 3/3413* (2013.01); *G09G 2300/0452* (2013.01); *G09G 2320/0233* (2013.01)

(58) Field of Classification Search
CPC ............... G09G 3/3426; G09G 3/3413; G09G 2300/0452; G09G 2320/0233
See application file for complete search history.

(56) References Cited

U.S. PATENT DOCUMENTS

2007/0242459 A1 10/2007 Nishigaki
2008/0158447 A1 * 7/2008 Yan ..................... H04N 9/3164 349/5

(Continued)

FOREIGN PATENT DOCUMENTS

CN 101317036 A 12/2008
CN 101739984 A 6/2010

(Continued)

OTHER PUBLICATIONS

CN202110120983.2 first office action.

(Continued)

*Primary Examiner* — Kenneth B Lee, Jr.
(74) *Attorney, Agent, or Firm* — IPro, PLLC

(57) ABSTRACT

A display module and a display device are provided. In the display module, a liquid crystal display panel has a plurality of display subareas. A color backlight module has a plurality of backlight subareas in a one-to-one correspondence to the plurality of display subareas. A driving apparatus may sequentially drive liquid crystal molecules in the display subareas to turn over, and after driving the liquid crystal molecules in each display subarea to turn over, drive a light-emitting element of one color included in each backlight source in one corresponding backlight subarea to emit light.

20 Claims, 19 Drawing Sheets

(56) References Cited

U.S. PATENT DOCUMENTS

| | | | | |
|---|---|---|---|---|
| 2008/0158875 | A1* | 7/2008 | Kim | G02B 27/0955 362/244 |
| 2009/0244885 | A1 | 10/2009 | Watanabe et al. | |
| 2018/0308412 | A1* | 10/2018 | Wu | H01L 27/124 |
| 2020/0249526 | A1* | 8/2020 | Gu | G02B 6/0028 |
| 2020/0355963 | A1 | 11/2020 | Liu et al. | |
| 2022/0236610 | A1 | 7/2022 | Ma et al. | |

FOREIGN PATENT DOCUMENTS

| | | | |
|---|---|---|---|
| CN | 102800294 | A | 11/2012 |
| CN | 103413529 | A | 11/2013 |
| CN | 206805079 | U | 12/2017 |
| CN | 108986752 | A | 12/2018 |
| CN | 111103723 | A | 5/2020 |
| CN | 111505861 | A | 8/2020 |
| CN | 114815348 | A | 7/2022 |
| JP | 2007322944 | A | 12/2007 |
| TW | 200935098 | A | 8/2009 |

OTHER PUBLICATIONS

U.S. Appl. No. 17/569,199 Non-final office Action dated Nov. 30, 2022.
U.S. Appl. No. 17/569,199 Notice of allowance dated Mar. 6, 2023.
CN202321349870.0 first office action.

* cited by examiner

| Included angle | Luminance (watt) | Uniformity |
|---|---|---|
| 140° | 141 | 63% |
| 150° | 142 | 71% |
| 160° | 158 | 72% |
| 170° | 180 | 84% |

DISPLAY MODULE, METHOD OF DRIVING SAME, AND DISPLAY DEVICE

CROSS-REFERENCE TO RELATED APPLICATION

This application is a continuation in part application of U.S. application Ser. No. 17/569,199, filed on Jan. 5, 2022, and claims the priorities to the Chinese patent application No. 202110120983.2, filed on Jan. 28, 2021 and entitled "DISPLAY DEVICE AND METHOD OF DRIVING SAME", and the Chinese patent application No. 202321349870.0, filed on May 30, 2023, the disclosures of which are herein incorporated by references in their entireties.

TECHNICAL FIELD

The present disclosure relates to the field of display technologies, and in particular, relates to a display module and a display device.

BACKGROUND OF THE INVENTION

With the development of display technologies, a series of color-film-less liquid crystal display modules have emerged. The color-film-less liquid crystal display module refers to a display module which does not involve any color film but is provided with a color backlight module. It can be seen that the color-film-less liquid crystal display module generally realizes the color display by means of the color backlight module.

Currently, the color-film-less liquid crystal display module includes a driving apparatus, and a color backlight module and a liquid crystal display panel that are stacked in sequence. The driving apparatus can be configured to first drive, by means of a progressive scanning, liquid crystal molecules included in the liquid crystal display panel to turn over, and then turn on a backlight source included in the color backlight module, so as to realize the display.

SUMMARY OF THE INVENTION

Embodiments of the present disclosure provide a display module and a display device. The technical solutions are described as below.

In some embodiments of the present disclosure, a display module is provided, and the display module includes:

a color backlight module and a liquid crystal display module stacked in sequence, wherein the liquid crystal display module includes a liquid crystal display panel having a plurality of display subareas arranged along a column direction, and the color backlight module has a plurality of backlight subareas in a one-to-one correspondence to the plurality of display subareas and includes a plurality of backlight sources located in each of the backlight subareas, each of the backlight sources including light-emitting elements of N colors, N being a positive integer greater than 1; and a driving apparatus connected to the color backlight module and the liquid crystal display module respectively and configured to sequentially execute N driving processes in response to receiving data of one frame of image, wherein an $i^{th}$ driving process includes:

sequentially driving the display subareas to switch from a non-light transmitting state to a light transmitting state, and after driving each display subarea to switch to the light transmitting state, driving a light-emitting element of an $i^{th}$ color included in each of the backlight sources in one backlight subarea corresponding to the display subarea as driven to emit light, i being a positive integer not greater than N;

wherein the display module further includes a plurality of light assigning assemblies between the liquid crystal display module and the color backlight module, wherein each of the plurality of light assigning assemblies includes a first end, a second end, and a body portion connecting the first end and the second end, wherein the first end is more distal from the liquid crystal display module than the second end, the plurality of backlight sources are disposed on the first ends of the plurality of light assigning assemblies, an orthogonal projection of each of the plurality of backlight sources on the liquid crystal display module is overlapped with an orthogonal projection of the corresponding light assigning assembly on the liquid crystal display module, and a light exiting face of each of the plurality of backlight sources faces towards the second end of the corresponding light assigning assembly.

In some embodiments, the plurality of light assigning assemblies are arranged in a one-to-one correspondence with the plurality of backlight sources, and the orthogonal projection of each of the plurality of backlight sources on the liquid crystal display module is within an orthogonal projection of the first end of the corresponding light assigning assembly on the liquid crystal display module.

In some embodiments, a center point of each of the plurality of backlight sources is overlapped with an axis line of the corresponding light assigning assembly.

In some embodiments, a size of the first end is less than a size of the second end, and at least one of the following requirements is met:

an orthogonal projection of the first end on the liquid crystal display module is within an orthogonal projection of the second end on the liquid crystal display module;

a center of the orthogonal projection of the first end on the liquid crystal display module is overlapped with a center of the orthogonal projection of the second end on the liquid crystal display module; and an orthogonal projection of an inner wall face of the body portion on the liquid crystal display module is within the orthogonal projection of the second end on the liquid crystal display module.

In some embodiments, the light assigning assembly includes a reflective cup, wherein a cup body of the reflective cup is the body portion of the light assigning assembly, a lower opening of the reflective cup is the first end of the light assigning assembly, and an upper opening of the reflective cup is the second end of the light assigning assembly;

wherein in a direction perpendicular to the liquid crystal display module, a distance between the lower opening of the reflective cup and the upper opening of the reflective cup is greater than or equal to 10 mm, and is less than or equal to 30 mm; and a plurality of reflective cups are an integrated structure, and an inner wall face of the cup body of the reflective cup includes a plurality of wall sub-faces, wherein an included angle between two adjacent wall sub-faces is a chamfer.

In some embodiments, the light assigning assembly includes a lens, wherein a lens body of the lens is the body portion of the light assigning assembly, a first end of the lens body is the first end of the light assigning assembly, a second end of the lens body is the second end of the light assigning assembly, and the lens body is a conical shell including a cavity;

the cavity of the lens body is provided with a first quadric surface, an inner wall of the lens body is provided with a second quadric surface, wherein the first quadric surface is convex toward the first end of the lens body, and the second quadric surface is convex toward the second end of the lens body;

light from the backlight source within a first incidence angle range is collimated and emitted from the second end of the lens body upon being refracted by the first quadric surface, and incidence light from the backlight source within a second incidence angle range is collimated and emitted from the second end of the lens body upon being refracted by the second quadric surface; a maximum angle within the first incidence angle range is less than a minimum angle within the second incidence angle range, and the first incidence angle range is an incidence angle range of light from the backlight source directly emitted from the second end of the lens body without being reflected by the inner wall of the lens body.

In some embodiments, the cavity of the lens body is provided with a third quadric surface, wherein the third quadric surface is convex toward the second end of the lens body and is disposed on a side, distal from the first end of the lens body, of the first quadric surface, and an orthogonal projection of the third quadric surface on the liquid crystal display module is overlapped with an orthogonal projection of the first quadric surface on the liquid crystal display module, wherein the light from the backlight source within the first incidence angle range is collimated and emitted from the second end of the lens body through the third quadric surface upon being refracted by the first quadric surface;

wherein each the first quadric surface, the second quadric surface, the third quadric surface comprises any one of a spherical face, an ellipsoidal spherical face, and an ellipsoidal paraboloid face.

In some embodiments, the orthogonal projection of the third quadric surface on the liquid crystal display module covers the orthogonal projection of the first quadric surface on the liquid crystal display module.

In some embodiments, the lens includes a first curved lens, a first fixed cavity, a second curved lens, and a second fixed cavity, wherein a first end of the first fixed cavity is affixed on the first end of the lens body, the first curved lens is affixed on a second end of the first fixed cavity, and a convex surface of the first curved lens forms the first quadric surface; and a first end of the second fixed cavity is affixed on the second end of the lens body, the second curved lens is affixed on a second end of the second fixed cavity, and a convex surface of the second curved lens forms the third quadric surface.

In some embodiments, at least one of the following requirements is met: both a focus of the first quadric surface and a focus of a third quadric surface are on a side of a second face of the backlight source, wherein the second face of the backlight source is the light exiting face of the backlight source; and the second quadric surface surrounds the backlight source, and a focus of the second quadric surface is on a side of a first face of the backlight source, wherein the first face of the backlight source is a face opposite to the light exiting face of the backlight source.

In some embodiments, at least one of the following requirements is met: a first distance between the focus of the second quadric surface and the backlight source ranges from 1 mm to 4 mm;

a second distance between the focus of the first quadric surface and the second face of the backlight source is greater than one-third of a distance between the first end of the lend body and the second end of the lens body; and a third distance between a focus of the third quadric surface and the second face of the backlight source is greater than half of the distance between the first end of the lend body and the second end of the lens body, and a distance between the third quadric surface and the second end of the lens body is less than a distance between the first quadric surface and the first end of the lens body.

In some embodiments, the driving apparatus is further configured to: drive at least one light-emitting element of a different color than the $i^{th}$ color in each of the backlight sources to emit light in the $i^{th}$ driving process, wherein a luminance of the light-emitting element of the $i^{th}$ color is higher than a luminance of the at least one light-emitting element of the different color.

In some embodiments, the driving apparatus is further configured to:

drive each light-emitting element of a different color than the $i^{th}$ color in each of the backlight sources to emit light in the $i^{th}$ driving process, wherein a luminance of the light-emitting element of the $i^{th}$ color is higher than a luminance of each light-emitting element of the different color.

In some embodiments, each of the backlight sources includes a light-emitting element of a first color, a light-emitting element of a second color and a light-emitting element of a third color.

In some embodiments, the three light-emitting elements in each of the backlight sources are arranged in a triangle pattern, and any two adjacent light-emitting elements in each of the backlight subareas are of different colors.

In some embodiments, each of the backlight sources further includes a light-emitting element of a fourth color; and the three light-emitting elements in each of the backlight sources are arranged in a triangle pattern, and any two adjacent light-emitting elements in each of the backlight subareas are of different colors.

In some embodiments, the first color is red, the second color is green, the third color is blue, and the fourth color is white; and in a case that the $i^{th}$ color is not white, the driving apparatus is further configured to drive a white light-emitting element included in each of the backlight sources to emit light in the $i^{th}$ driving process.

In some embodiments, the light-emitting elements of N colors in each of the backlight sources is integrated in a same chip.

In some embodiments, the display module further includes:

a gain film disposed on a side of the plurality of light assigning assemblies distal from the backlight sources; and a fog screen disposed on a side of the gain film distal from the plurality of light assigning assemblies.

In some embodiments, the driving apparatus includes a processing circuit, a control circuit, a backlight driving circuit and a power supply circuit, and the liquid crystal display module further includes a display panel driving circuit;

the processing circuit is respectively connected to the display panel driving circuit and the control circuit, and configured to receive image data and to transmit an initial driving signal to the display panel driving circuit and the control circuit based on the image data;

the display panel driving circuit is further connected to the liquid crystal display panel and configured to drive the display subareas to switch from the non-light transmitting state to the light transmitting state;

the control circuit is further connected to the backlight driving circuit and configured to transmit a backlight driving signal to the backlight driving circuit under the control of the initial driving signal;

the backlight driving circuit is further connected to the color backlight module and configured to drive the backlight sources included in the color backlight module to emit light under a control of the backlight driving signal; and the power supply circuit is connected to the color backlight module and configured to power the color backlight module.

In some embodiments of the present disclosure, a display device is provided, and the display device includes: a power supply component and a display module; the power supply component is connected to the display module and configured to power the display module; and the display module includes:

a color backlight module and a liquid crystal display module stacked in sequence, wherein the liquid crystal display module includes a liquid crystal display panel having a plurality of display subareas arranged along a column direction, and the color backlight module has a plurality of backlight subareas in a one-to-one correspondence to the plurality of display subareas and includes a plurality of backlight sources located in each of the backlight subareas, each of the backlight sources including light-emitting elements of N colors, N being a positive integer greater than 1; and a driving apparatus connected to the color backlight module and the liquid crystal display module respectively and configured to sequentially execute N driving processes in response to receiving data of one frame of image, wherein an $i^{th}$ driving process includes:

sequentially driving the display subareas to switch from a non-light transmitting state to a light transmitting state, and after driving each display subarea to switch to the light transmitting state, driving a light-emitting element of an $i^{th}$ color included in each of the backlight sources in one backlight subarea corresponding to the display subarea as driven to emit light, i being a positive integer not greater than N;

wherein the display module further includes a plurality of light assigning assemblies between the liquid crystal display module and the color backlight module, wherein each of the plurality of light assigning assemblies includes a first end, a second end, and a body portion connecting the first end and the second end, wherein the first end is more distal from the liquid crystal display module than the second end, the plurality of backlight sources are disposed on the first ends of the plurality of light assigning assemblies, an orthogonal projection of each of the plurality of backlight sources on the liquid crystal display module is overlapped with an orthogonal projection of a corresponding light assigning assembly on the liquid crystal display module, and a light exiting face of each of the plurality of backlight sources faces towards the second end of the corresponding light assigning assembly.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION OF THE INVENTION

In order to make the purposes, technical solutions and advantages of the present disclosure clearer, the following further describes the embodiments of the present disclosure in detail with reference to the accompanying drawings.

Color-film-less display panels are widely used in various display modules because they can realize color display without needing to dispose a color film. A display module equipped with the color-film-less display panel may be referred to as a color-film-less display module. Currently, compared with a conventional display module (i.e., a display module with color films), the color-film-less display module not only has a high resolution, but also has a low heat generation and a low power consumption. However, the inventors have discovered that the current color-film-less display modules are low in luminance and have serious color crosstalk.

Embodiments of the present disclosure provide a display module, which not only can be implemented as a color-film-less display module but also can avoid or alleviate the color crosstalk, and can achieve a high display luminance and excellent display effect.

Figure 1:
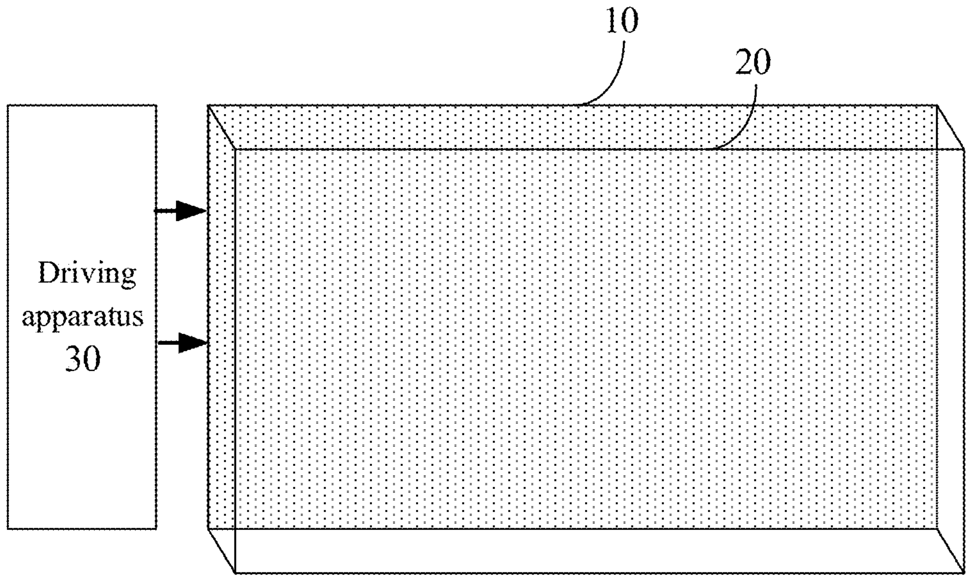
FIG. 1 is a schematic structural diagram of a display module according to an embodiment of the present disclosure.

FIG. 1 is a schematic structural diagram of a display module according to an embodiment of the present disclosure. As shown in FIG. 1, the display module may include a color backlight module 10 and a liquid crystal display module 20 stacked in sequence. The liquid crystal display module 20 may include a liquid crystal display panel, and the liquid crystal display panel may include a plurality of pixels arranged in an array. Each pixel may at least include a pixel electrode, a common electrode and a plurality of liquid crystal molecules, and the plurality of liquid crystal molecules may be turned over under the action of a voltage difference between the pixel electrode and the common electrode. In the case that the plurality of liquid crystal molecules are turned over from one state to another state, the liquid crystal display panel is switched from one of a light transmitting state and a non-light transmitting state to the other state. Generally, in an initial state prior to turning over, the liquid crystal display panel is in the non-light transmitting state, and is in the light transmitting state upon turning over. That is, driving the liquid crystal molecules to turn over may cause that the liquid crystal display panel is switched from the light transmitting state to the non-light transmitting state.

In an embodiment of the present disclosure, the liquid crystal display panel may have a plurality of display subareas arranged along a column direction. The color backlight module 10 may have a plurality of backlight subareas in a one-to-one correspondence to the plurality of display subareas. Furthermore, the color backlight module 10 may include a plurality of backlight sources 101 located in each backlight subarea, and each backlight source 101 may include light-emitting elements L1 of N colors, where N may be a positive integer greater than 1. Each light-emitting element L1 is configured to emit light of a single color.

Figure 2:
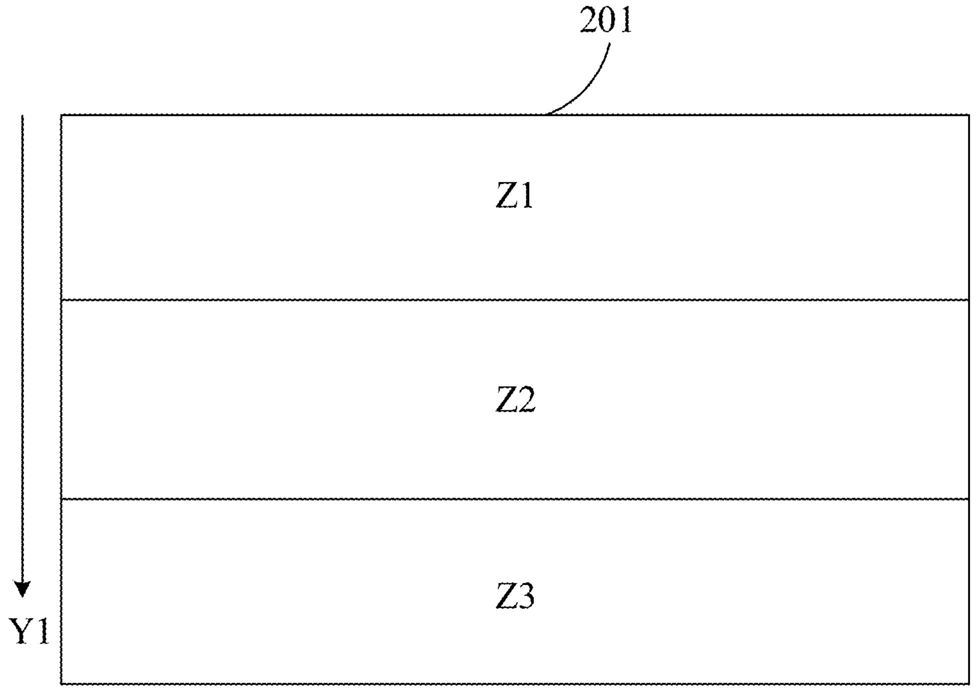
FIG. 2 is a schematic structural diagram of a liquid crystal display panel according to an embodiment of the present disclosure.

For example, a liquid crystal display panel 201 shown in FIG. 2 has three display subareas Z1, Z2 and Z3 arranged along a column direction Y1. The color backlight module 10 shown in FIG. 3 has three backlight subareas M1, M2 and M3. Referring to all of FIGS. 1 to 3, the backlight subarea M1 may correspond to the display subarea Z1, the backlight subarea M2 may correspond to the display subarea Z2, and the backlight subarea M3 may correspond to the display subarea Z3. Furthermore, in the color backlight module 10 shown in FIG. 3, each backlight source 101 includes three light-emitting elements L1 each having a different color, i.e., each backlight source 101 includes three light-emitting elements L1, and the three light-emitting elements L1 are of different colors. For example, referring to FIG. 3, in each backlight source 101, the color of the light-emitting element L1 on the left may be red (R), the color of the light-emitting element L1 in the middle may be green (G), and the color of the light-emitting element L1 on the right may be blue (B).

It should be noted that the number of pixels included in the liquid crystal display panel 201 may be different from the number of the backlight sources 101 included in the color backlight module 10. Generally, the number of the backlight sources 101 included in the color backlight module 10 is far less than the number of the pixels included in the liquid crystal display panel 201. That is, one backlight source 101 may provide color backlight for a plurality of pixels. In this way, it can be seen that the display module described in the embodiments of the present disclosure can realize color display without the need of disposing the color film.

Continuously referring to FIG. 1, the display module described in the embodiments of the present disclosure may further include a driving apparatus 30, which may be connected to the color backlight module 10 and the liquid crystal display module 20 respectively. The driving apparatus 30 may be configured to receive data of an image, and may sequentially execute N driving processes based on or in response to data of one frame of the image as received. Here, an $i^{th}$ driving process may include:

sequentially driving the display subareas to switch from a non-light transmitting state to a light transmitting state, that is, sequentially driving the liquid crystal molecules the display subareas to turn over, and after driving the liquid crystal molecules in each display subarea to turn over, driving a light-emitting element L1 of an $i^{th}$ color included in each backlight source 101 in one backlight subarea corresponding to the display subarea to emit light, where i may be a positive integer not greater than N. Here, by sequentially driving the liquid crystal molecules in the display subareas to turn over, it means that the liquid crystal molecules in a first display subarea are driven to turn over, then the liquid crystal molecules in a second display subarea are driven to turn over, then the liquid crystal molecules in a third display subarea are driven to turn over, and so on.

It can be known from the descriptions of the foregoing embodiments that the action of driving the liquid crystal molecules to turn over is performed under the premise of charging the pixel electrode of the pixel to which the liquid crystal molecules belong. That is, the driving apparatus 30 may be configured to sequentially charge (optionally, through a progressive scanning) the pixels in each display subarea, to drive the liquid crystal molecules in each display subarea to turn over.

Figure 3:
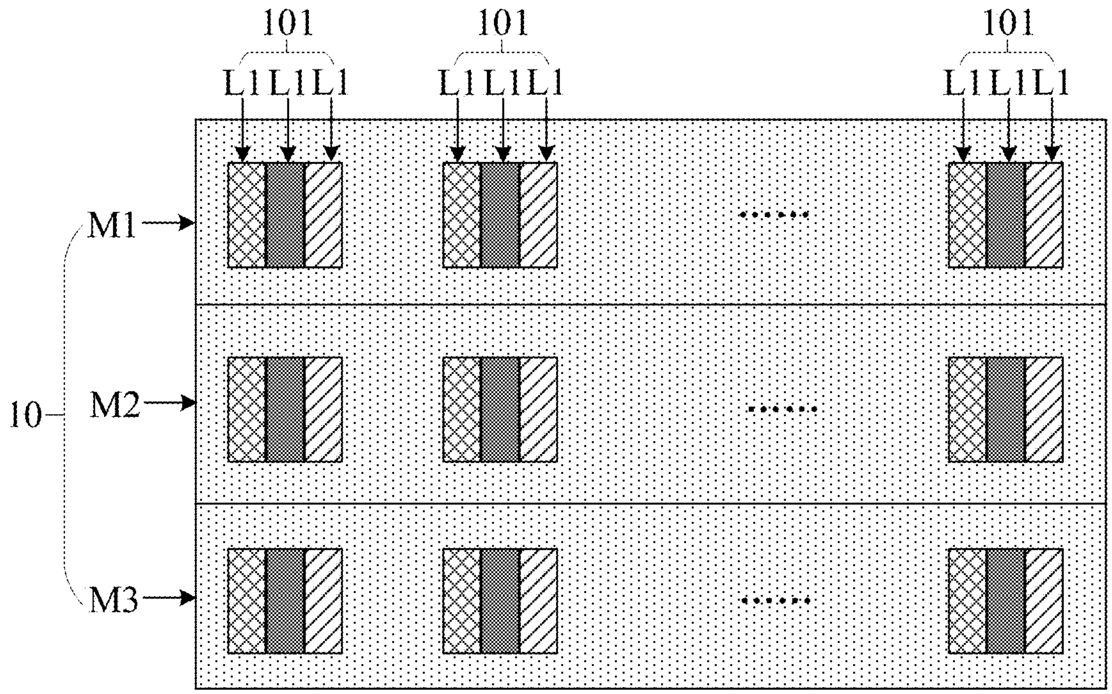
FIG. 3 is a schematic structural diagram of a color backlight module according to an embodiment of the present disclosure.

Exemplarily, referring to the color backlight module 10 shown in FIG. 3, each backlight source 101 may include three light-emitting elements L1 having the color of red, green or blue, respectively, i.e., N is equal to 3. Then, with reference to the time sequence diagram shown in FIG. 4, the driving apparatus 30 may sequentially execute three driving processes T1, T2 and T3 upon receiving data of one frame of image.

Here, the first driving process T1 may include: (1) charging the pixel electrode of each pixel in the first display subarea Z1 to drive the liquid crystal molecules in the first display subarea Z1 to turn over to cause the first display subarea Z1 to switch to the light transmitting state, and after the liquid crystal molecules in the first display subarea Z1 are turned over, driving a light-emitting element L1 of a first color included in each backlight source 101 in the first backlight subarea M1 corresponding to the first display subarea Z1 to emit light; (2) charging the pixel electrode of each pixel in the second display subarea Z2 to drive the liquid crystal molecules in the second display subarea Z2 to turn over to cause the second display subarea Z2 to switch to the light transmitting state, and after the liquid crystal molecules in the second display subarea Z2 are turned over, driving a light-emitting element L1 of a first color included in each backlight source 101 in the second backlight subarea M2 corresponding to the second display subarea Z2 to emit light; and (3) charging the pixel electrode of each pixel in the third display subarea Z3 to drive the liquid crystal molecules in the third display subarea Z3 to turn over to cause the third display subarea Z3 to switch to the light transmitting state, and after the liquid crystal molecules in the third display subarea Z3 are turned over, driving a light-emitting element L1 of a first color included in each backlight source 101 in the third backlight subarea M3 corresponding to the third display subarea Z3 to emit light.

Therefore, in the first driving process T1, the light-emitting elements L1 of the first color (e.g., the red (R) color) in all the backlight sources 101 included in the color backlight module 10 are turned on. Still referring to the time sequence diagram shown in FIG. 4, similarly, in the second driving process T2, all the light-emitting elements L1 of a second color (e.g., the green (G) color) included in the respective backlight sources 101 are driven to emit light; and similarly, in the third driving process T3, all the light-emitting element L1 of a third color (e.g., the blue (B) color) included in the respective backlight sources 101 are driven to emit light.

Upon completion of the above three driving processes, the display module may successfully display the one frame of image. In this way, one driving process may also be referred to as a monochrome-frame scanning time (or, a monochrome-frame charge), and the N driving processes may be collectively referred to as one image (one frame of image) scanning time (or, an image charge). That is, one frame of image would be equal to a superposition or combination of several monochrome-frames. In addition, in the time sequence diagram shown in FIG. 4, $T_{CT}$ indicates a time period for charging the pixel electrode, $T_{LT}$ indicates a time period for the liquid crystal molecules to turn over, and $T_{BT}$ indicates a time period for a light-emitting element L1 to emit light. Moreover, the high potential represents charging the pixel electrode and driving the light-emitting element L1 to emit light, and the low potential represents that the charging of the pixel electrode is completed and the liquid crystal molecules are being turned over. The high potential is greater than the low potential.

Figure 4:
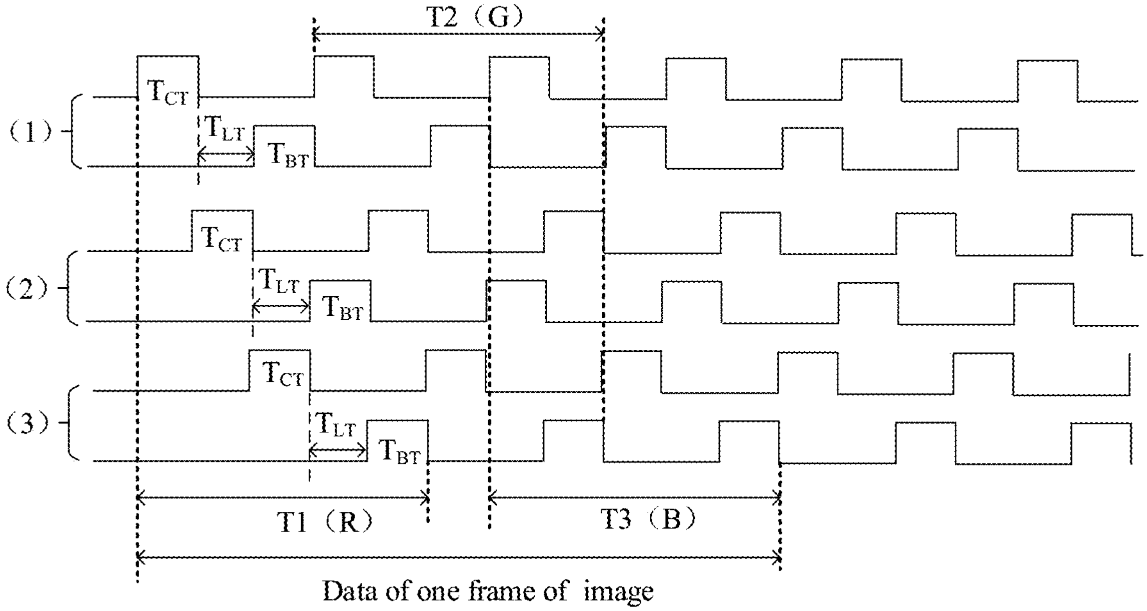
FIG. 4 is a driving time sequence diagram according to an embodiment of the present disclosure.

Besides, combining the time sequence diagram shown in FIG. 4, it can be known that the display luminance Lu of one frame of image may meet the following equation:

$$Lu=Lr0*T_{BT}+Lg0*T_{BT}+Lb0*T_{BT},$$

where Lr0 indicates the luminance of the red light-emitting element L1, Lg0 indicates the luminance of the green light-emitting element L1, and Lb0 indicates the luminance of the blue light-emitting element L1.

In view of the descriptions of the foregoing embodiments, it can be determined that through the partitioning of the driving processes, charging of the pixel electrodes included in the pixels can be accelerated (i.e., $T_{CT}$ is reduced), and then a time period for turning over the liquid crystal molecules can be prolonged (i.e., $T_{BT}$ is increased), so as to ensure that the liquid crystal molecules can be turned over reliably and successfully prior to turning on the backlight sources. In this way, the color crosstalk challenge due to the liquid crystal molecules being incapable of turning over timely in the related art can be effectively solved or alleviated. In addition, by individually controlling the respective light-emitting elements L1 of different colors to emit light, an excellent display effect can be further guaranteed.

Figure 5:
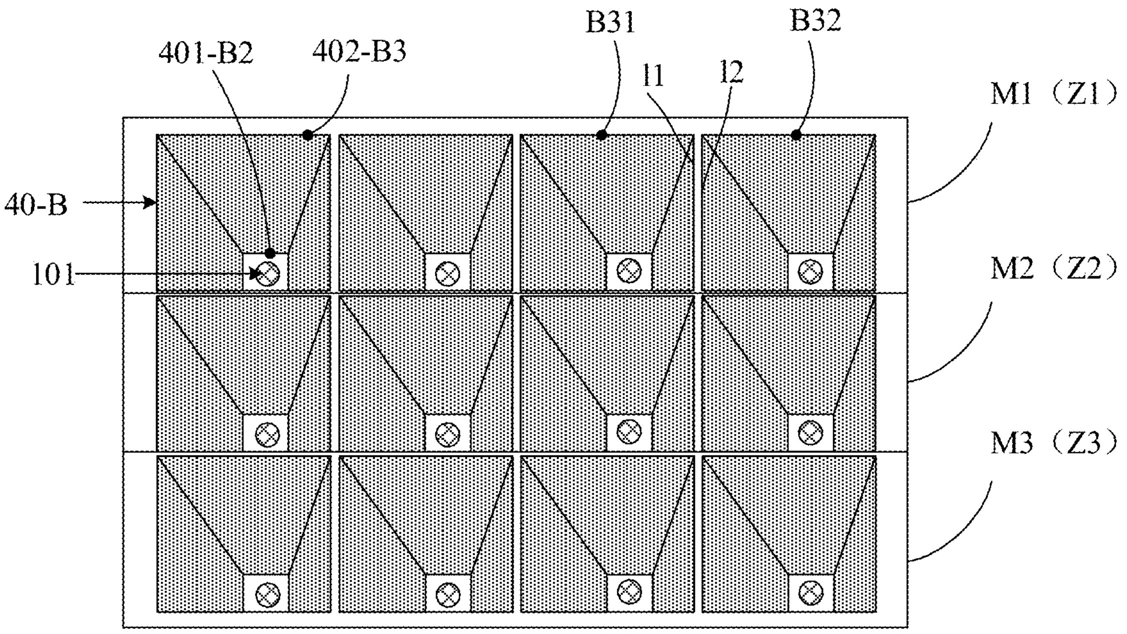
FIG. 5 is a schematic structural diagram of a light assigning assembly according to an embodiment of the present disclosure.

In some embodiments, as shown in FIG. 5, the display module in the embodiments of the present disclosure further includes a plurality of light assigning assemblies 40 between the liquid crystal display module 20 and the color backlight module 10. Each of the plurality of light assigning assemblies 40 includes a first end 401, a second end 402, and a body portion 403 connecting the first end 401 and the second end 402. The first end 401 is more distal from the liquid crystal display module 20 than the second end 402.

In some embodiments, the display module shown in FIG. 5 includes 12 light assigning assemblies 40 between the liquid crystal display module 20 and the color backlight module 10, and each display subarea is disposed with three light assigning assemblies 40.

In addition, the plurality of backlight sources 101 are disposed on the first ends 401 of the plurality of light assigning assemblies 40, an orthogonal projection of each of the plurality of backlight sources 101 on the liquid crystal display module 20 is overlapped with an orthogonal projection of a corresponding light assigning assembly 40 on the liquid crystal display module 20, and a light exiting face of each of the plurality of backlight sources 101 faces towards the second end 402 of the corresponding light assigning assembly 40, such that the light is emitted through the second end 402.

By disposing the light assigning assembly 40, the light emitted from the backlight source 101 can be adjusted. For example, in the case that the light assigning assembly 40 is a reflective cup, the light emitted from the backlight source 101 can be collimated and adjusted, such that the display luminance and display uniformity of the liquid crystal display module 20 are improved, and the display effect is great.

In summary, the embodiments of the present disclosure provide a display module which includes a color backlight module, a liquid crystal display panel and a driving apparatus. The liquid crystal display panel has a plurality of display subareas arranged along a column direction, and the color backlight module has a plurality of backlight subareas in a one-to-one correspondence to the plurality of display subareas and includes a plurality of backlight sources. As the driving apparatus is configured to sequentially drive liquid crystal molecules in the display subareas to turn over, and each time the liquid crystal molecules in each display subarea have been turned over, the driving apparatus is further configured to drive the light-emitting element of one color included in each backlight source in one corresponding backlight subarea to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

In some embodiments, it can be seen referring to FIG. 5 that the plurality of light assigning assemblies 40 in the embodiments of the present disclosure are arranged in a one-to-one correspondence with the plurality of backlight sources 101. That is, the display module includes the light assigning assemblies 40 arranged in multiple rows and multiple columns, each of the light assigning assemblies 40 corresponds to one backlight source 101, and different light assigning assemblies 40 correspond to different backlight sources 101. That is, each backlight source 101 corresponds to the second end 402 of the corresponding light assigning assembly 40, and different backlight sources 101 are disposed on the second ends of different light assigning assemblies 40. As such, the light emitted from the backlight source 101 is further adjusted.

Figure 6:
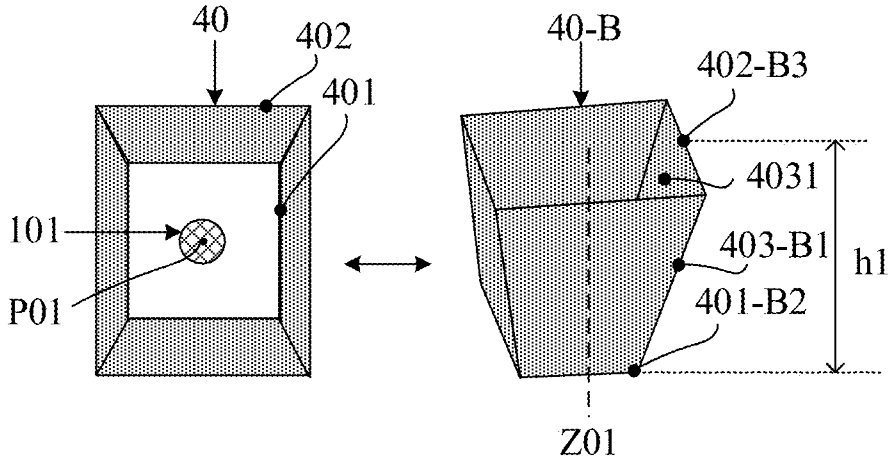
FIG. 6 is a top view and a front view of the light assigning assembly shown in FIG. 5.

In some embodiments, by taking the structure shown in FIG. 5 as an example, FIG. 6 is a top view and a front view of a light assigning assembly 40. It can be seen referring to FIG. 6 that a center point P01 of each of the plurality of backlight sources 101 is overlapped with an axis line Z01 of the corresponding light assigning assembly 40. The center point P01 of the backlight source 101 is a dead center position of the backlight source 101. For example, assuming that the backlight source 101 is in a rectangular shape shown in FIG. 6, the center point P01 of the backlight source 101 is an intersected point of two diagonal lines of the rectangle. The axis line Z01 of the light assigning assembly 40 is a line between the first end 401 of the light assigning assembly 40 and the second end 402 of the light assigning assembly 40, and is also referred to as a central axis line or a normal line. That is, in the embodiments of the present disclosure, as shown in FIG. 6, the backlight source 101 is disposed on a dead center of the first end 401 of the light assigning assembly 40, and a light emitting center of the backlight source 101 is the dead center of the light assigning assembly 40, such that the light emitted from the backlight source 101 is reliably exited through the second end 402 of the light assigning assembly 40, and a light emitting efficiency id improved.

In some embodiments, it can be seen referring to FIG. 5 and FIG. 6 that a size of the first end 401 of the light assigning assembly 40 is less than a size of the second end 402 of the light assigning assembly 40. In some embodiments, the size of the first end 401 is an area of the orthogonal projection of the first end 401 on the liquid crystal display module 20, and the size of the second end 402 is determined in the same manner.

In some embodiments, as shown in FIG. 5 and FIG. 6, the orthogonal projection of the first end 401 on the liquid crystal display module 20 is within an orthogonal projection of the second end 402 on the liquid crystal display module 20, and/or, a center of the orthogonal projection of the first end 401 on the liquid crystal display module 20 is overlapped with a center of the orthogonal projection of the second end 402 on the liquid crystal display module 20, and/or, an orthogonal projection of an inner wall face 4031 of the body portion 403 on the liquid crystal display module 20 is within the orthogonal projection of the second end 402 on the liquid crystal display module 20. That is, a size of a portion protruded from the inner wall face 4031 of the body portion 403 is not beyond a coverage range of the second end 402.

The inner wall face 4031 of the body portion 403 is a face, proximal to a side of an inner space of the light assigning assembly 40, of the body portion 403, and the light emitted from the backlight source 101 is exited through the inner space. Accordingly, the inner space is a space enclosed by the first end 401, the second end 402, and the inner wall face.

In some embodiments, the light assigning assembly 40 in the embodiments of the present disclosure includes a reflective cup B shown in FIG. 5 and FIG. 6. A cup body B1 of the reflective cup B is the body portion 403 of the light assigning assembly 40, a lower opening of B2 the reflective cup B is the first end 401 of the light assigning assembly 40, and an upper opening B3 of the reflective cup is the second end 402 of the light assigning assembly 40.

By disposing the reflective cup B as the light assigning assembly 40, a function of collimation and emitting of the light is achieved. The light emitted from the backlight source 101 is reflected by the inner wall face 4031 of the cup body, light emitted at a previous squint angle is deflected towards a front angle upon multiple reflection, and a divergence angle of the light emitted from the upper opening B3 is less than a divergence angle of the light emitted from the backlight source 101 disposed on the lower opening B2, such that the front angle is improved.

In some embodiments, it can be seen in conjunction with FIG. 6 that in a direction perpendicular to the liquid crystal display module 20, a distance h1 (that is, a height of the reflective cup B) between the lower opening B2 of the reflective cup and the upper opening B3 of the reflective cup is greater than or equal to 10 mm, and is less than or equal to 30 mm.

Figure 7:
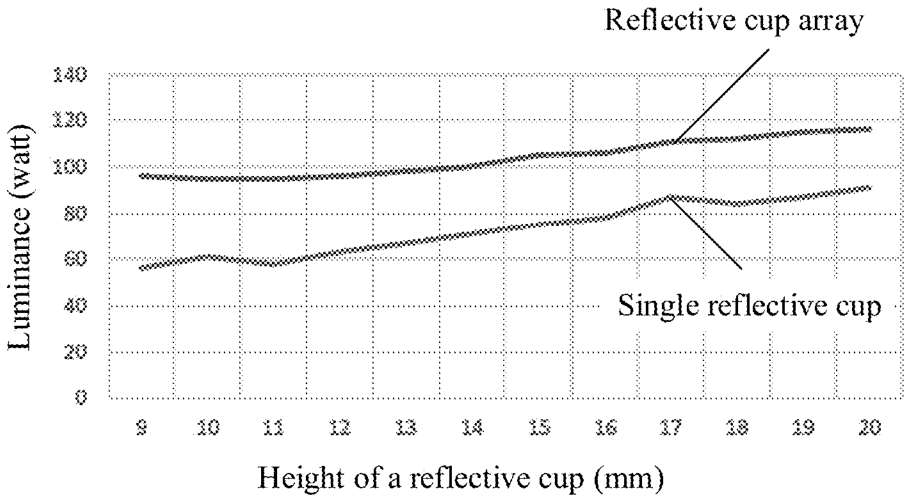
FIG. 7 is a simulated diagram of a height and a luminance of a reflective cup according to an embodiment of the present disclosure.

In some embodiments, FIG. 7 shows luminance values of the display modules corresponding to the reflective cups B with different heights h1. The abscissa is indicative of the height h1 of the reflective cup h1 with a unit of mm, and the ordinate is indicative of the luminance value with a unit of watt (w). It can be seen referring to FIG. 7 that the luminance value is increased with increment of the height h1 in a range of 9 mm to 20 mm. However, with the increment of the height h1, the difficulty in manufacturing the reflective cup B is increased. Thus, in practical implementations, the height of the reflective cup B is determined based on the difficulty in manufacturing the reflective cup B and the actual effect.

In some embodiments, in a direction of a center axis line Z01 of the reflective cup B, the distance h1 between the lower opening B2 and the upper opening B3 is 15 mm, 18 mm, 20 mm, 22 mm, 25 mm, and the like.

Figure 8:
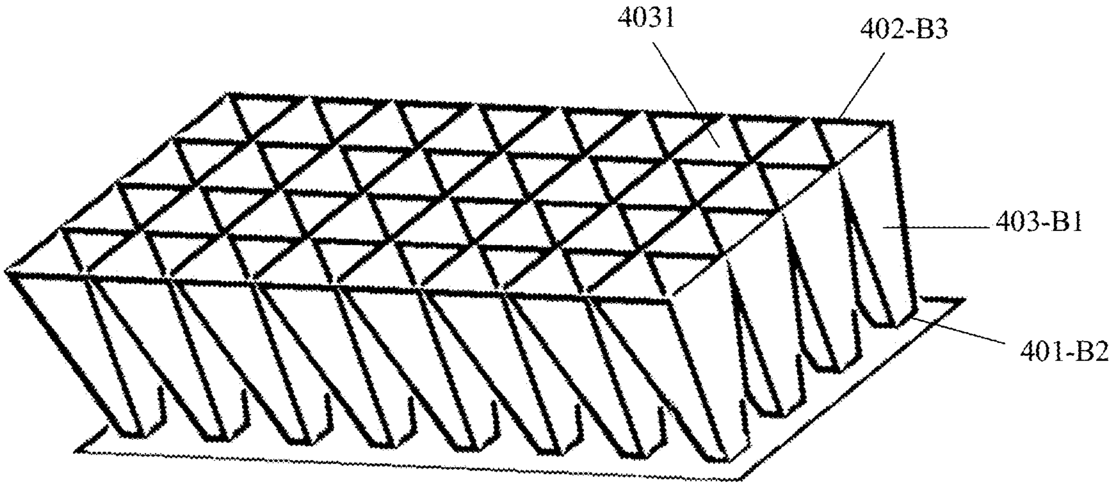
FIG. 8 is a schematic diagram of a reflective cup array according to an embodiment of the present disclosure.

In some embodiments, by taking the light assigning assembly 40 being the reflective cup as an example, it can be seen referring to FIG. 8 that the plurality of reflective cups B in the embodiments of the present disclosure are an integrated structure.

Figure 9:
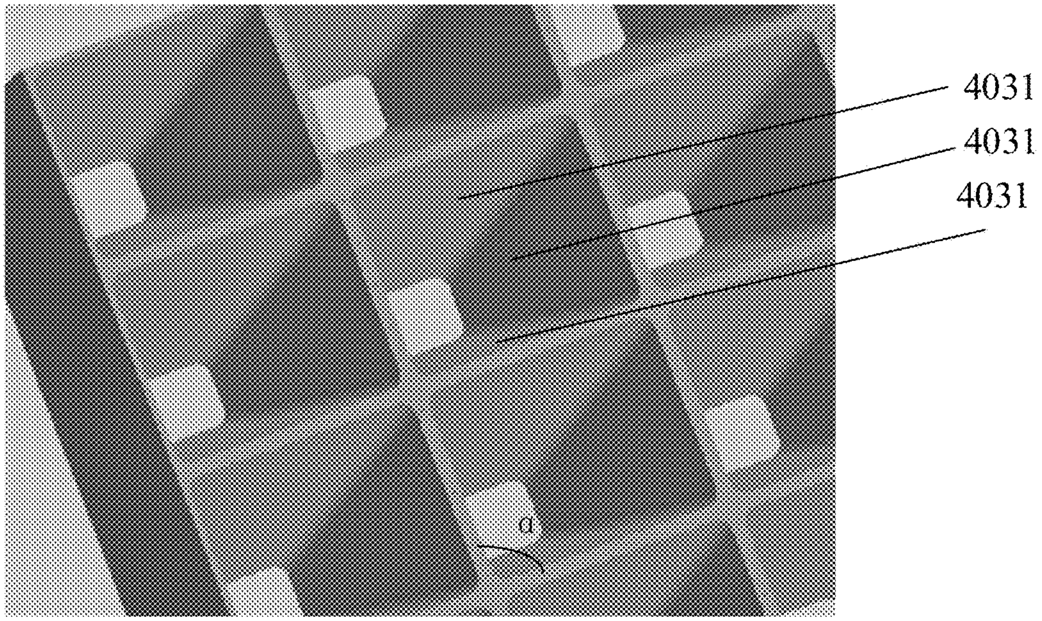
FIG. 9 is a schematic diagram of a reflective cup array according to an embodiment of the present disclosure.

In addition, on the basis of FIG. 8, it can be seen referring to FIG. 9 that the inner wall face 4031 of the cup body B of the reflective cup includes a plurality of wall sub-faces, and an included angle α between two adjacent wall sub-faces is a chamfer.

In some embodiments, the chamfer is a round chamfer shown in FIG. 9. In some embodiments, the chamfer is a bevel chamfer. By disposing a chamfer between two adjacent wall sub-faces, the difficulty in manufacturing is reduced, and the light is adjusted.

In FIG. 9, as both the lower opening B2 and the upper opening B3 are in a rectangular shape, the inner wall face 4031 includes four wall sub-faces, and an included angle α between any two adjacent wall sub-faces is a chamfer.

In some embodiments, a radius of the round chamfer is 0.5 mm, and/or a thickness (that is, a wall thickness) of the wall sub-face is 0.5 mm. The luminance uniformity is further improved based on the parameters upon tests.

In some embodiments, in conjunction with FIG. 5, in the plurality of reflective cups B arranged in an array, upper openings B3 of two adjacent reflective cups B include a first upper opening B31 and a second upper opening B32. The first upper opening B31 is provided with a first side edge 11 proximal to the second upper opening B32, and the second upper opening B32 is provided with a second side edge 12 proximal to the first upper opening B31. The first side edge 11 is parallel to the second side edge 12. In some embodiments, a length of the first side edge 11 is equal to a length of the second side edge 12.

In some embodiments, a minimum distance between the first upper opening B31 and the second upper opening B32 is greater than or equal to 0.2 mm, and is less than or equal to 2 mm. That is, a distance between two adjacent reflective cups B is less. As such, the luminance uniformity is greatly improved. In some embodiments, the minimum distance between two adjacent upper openings is 0.5 mm, 0.8 mm, 1 mm, and the like, which is not limited in the embodiments of the present disclosure.

In some embodiments, an inner wall face 4031 of the cup body includes at least one of a plane, a polygonal face, and a curved face.

Figure 10:
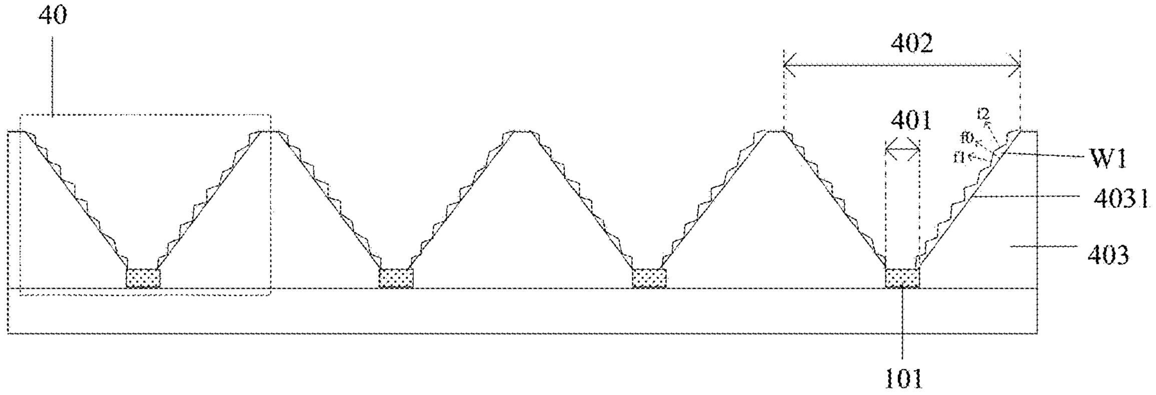
FIG. 10 is a section diagram of a reflective cup according to an embodiment of the present disclosure.

In some embodiments, in the case that the light assigning assembly 40 is the reflective cup B, it can be seen referring to the light assigning assembly 40 shown in FIG. 10 that the inner wall face 4031 of the cup body is a plane in some embodiments. In some embodiments, it can be seen referring to the light assigning assembly 40 shown in FIG. 11 that the inner wall face 4031 of the cup body is a curved face in some embodiments.

Figure 11:
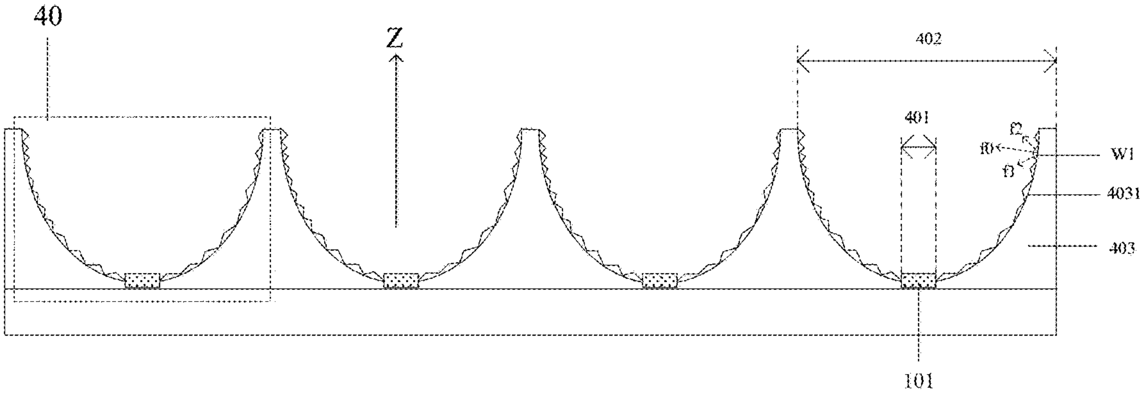
FIG. 11 is a section diagram of another reflective cup according to an embodiment of the present disclosure.

In some embodiments, in conjunction with FIG. 11, the inner wall face 4031 of the cup body includes a curved face with a changed curvature or a fixed curvature, such as, a paraboloid face, a Bezier face, a cylindrical face, a conical face, and a spherical face. The inner wall face shown in FIG. 11 is a Bezier face.

In some embodiments, as shown in FIG. 11, inner wall face 4031 of the cup body includes a curved face, and the curvature of the curved face is gradually changed in a Z direction. The Z direction is a direction from the lower opening B2 to the upper opening B3.

In a direction perpendicular to the Z direction, the curvature of the curved face is not changed. That is, the curvatures at different positions in a same height are the same, as shown in FIG. 11. In some embodiments, in the direction perpendicular to the Z direction, the curvature of the curved face is changed, which is not limited in the present disclosure.

In some embodiments, as shown in FIG. 11, the inner wall face 4031 of the cup body includes a curve face protruding towards a side facing away from an inner space of the reflective cup, that is, the inner wall face 4031 of the cup body is a convex curved face, such that a number of reflection of the light in the reflective cup is improved, and the luminance in a specific angle (for example, a divergence angle of the light emitted from the upper opening) range is further improved.

In some embodiments, it can be seen referring to FIG. 10 that the reflective cup further includes a plurality of first micro structures W1 on an inner wall face 4031 of the cup body of the reflective cup. Each of the plurality of first micro structures W1 includes a plurality of reflective faces configured to reflect light from the backlight source 101, and directions of normal lines of at least two reflective faces of the plurality of first micro structures W1 and a direction of a normal line of the inner wall face of the cup body covered by the first micro structure are different.

By disposing the plurality of first micro structures W1 on the inner wall face 4031 of the cup body, the directions of normal lines (such as f1 and f2 shown in FIG. 10) of at least two reflective faces of the plurality of first micro structures W1 and the direction of the normal line (such as f0 shown in FIG. 10) of the inner wall face of the cup body covered by the first micro structure are different, that is, the directions of the three normal lines f1, f2, and f0 shown in FIG. 10 are different. As such, an area of a reflection face is increased, and directions of the reflection face are increased, such that the incident light in a greater angle range is collimated and adjusted to increase the luminance in the angle range, and the angle uniformity of the incident light in the angle range is improved to improve the uniformity of the luminance.

Figure 12:
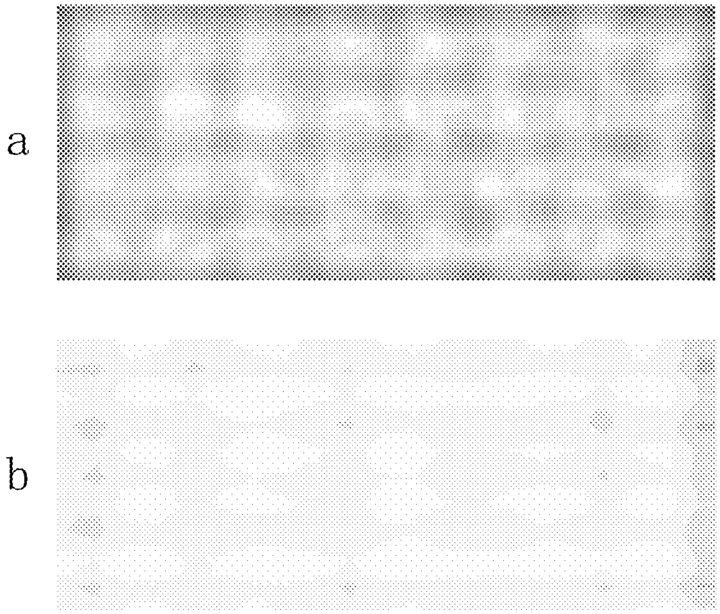
FIG. 12 is a simulated diagram of a display effect according to an embodiment of the present disclosure.

For the effect of disposing the micro structure, the backlight module with the micro structure and the backlight module without the micro structure are simulated, and a result of the simulation is shown in FIG. 12. The diagram a in FIG. 12 is a display effect of the backlight module without the first micro structure, and the diagram b in FIG. 12 is a display effect of the backlight module with the first micro structure. It can be seen by comparison that the luminance uniformity of the backlight module with the micro structure is greater.

In practical implementations, the first micro structure W1 is a convex structure (as shown in FIG. 10) or a concave structure on the inner wall face 4031 of the cup body of the reflective cup, which is not limited in the present disclosure.

In some embodiments, as shown in FIG. 8, both the lower opening B2 and the upper opening B3 of the reflective cup are in a rectangular shape, a long side of the rectangle of the lower opening B2 is parallel to a long side of the rectangle of the upper opening B3, and an orthogonal projection of a center of the rectangle of the lower opening B2 is coincided with an orthogonal projection of a center of the rectangle of the upper opening B3. In this case, the inner wall face 4031 of the cup body includes four side faces.

Figure 13:
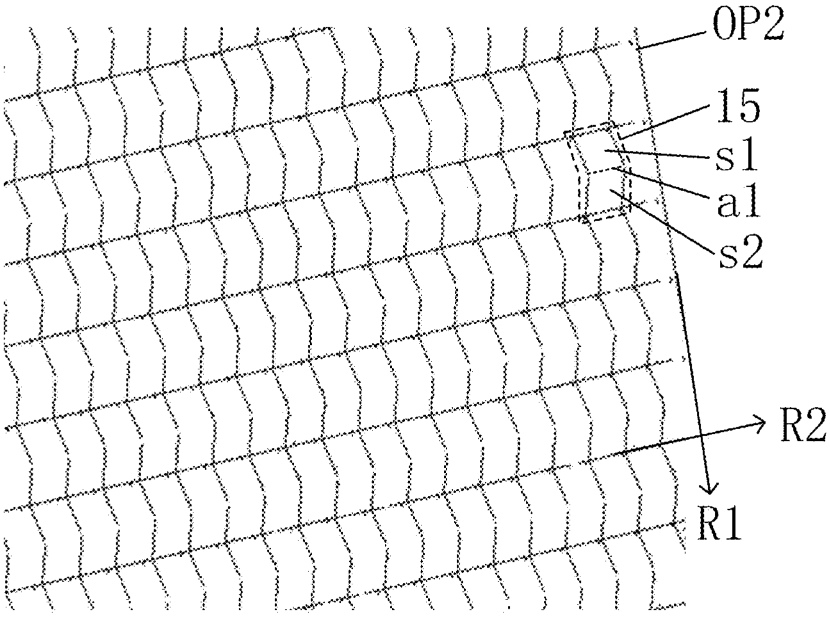
FIG. 13 is a top view of a reflective cup according to an embodiment of the present disclosure.

In the case that the four side faces of the inner wall face 4031 of the cup body is a plane, the shared edge al of the plurality of first micro structures W1 arranged in a R2 direction shown in FIG. 13 are in a same straight line.

In the case that the four side faces of the inner wall face 4031 of the cup body is a curved face, the shared edge al of each of the plurality of first micro structures is perpendicular to a boundary direction (such as a R1 direction shown in FIG. 13) of the lower opening B2 or the upper opening B3, the shared edges al of the plurality of first micro structures W1 arranged in the R2 direction shown in FIG. 13 are not in a same straight line as the inner wall face 4031 of the cup body is the curved face.

In practical implementations, a shape of the inner wall face 4031 of the cup body is set according to actual requirements using an optical simulation software, such as Light-Tools. The inventors set the reflective cup B using the Light-Tools, and a smoothing curve is generated based a second order Bezier curve. The second order Bezier curve is:

$$B(t)=(1-t)^2P_0+2t(1-t)P_1+t^2P_2, t\in[0,1].$$

P0, P1, and P2 represent three fixed points, t represents a control connection points among the three fixed points. Based on the above Bezier curve, the inner wall face 4031 of the cup body is generated by less control points. The inner wall face 4031 of the cup body includes four curved faces with a changed curvature, that is, a Bezier face.

In some embodiments, as shown in FIG. 8, the size of the lower opening B2 of the rectangle is 2.6 mm*2.2 mm, and the size of the upper opening B3 of the rectangle is 8.55 mm*7.26 mm. The plurality of reflective cups are arranged in a long side and a short side of the rectangle, and a number of the reflective cups is 32 (the 8*4 array shown in FIG. 8). A size of the whole backlight module is 68.4 mm*29.04 mm*20 mm, and the luminance of each backlight source is 35 lumens. The simulation is performed based on the above parameters of the backlight module, and a result of the simulation indicates that a divergence angle of the light emitted from the backlight source 101 and collimated by the reflective cup B is less than 25°*18°. A thickness (that is, a distance between a face on a side of the color backlight module facing away from the backlight source 101 and the liquid crystal display module 20) of the backlight module used in the simulation is 40 mm.

In some embodiments, a position, with a maximum curvature, of the inner wall face 4031 of the cup body is a first position, and a distance between the first position and the lower opening B2 is less than a distance between the first position and the upper opening B3 in the direction of the normal line of the liquid crystal display module 20. That is, in the direction of the normal line of the display module, the position, with the maximum curvature, of the inner wall face 4031 of the cup body is proximal to the lower opening B2.

In some embodiments, as shown in FIG. 6, both the lower opening B2 and the upper opening B3 are in the rectangular shape, such that the upper opening B3 is closely arranged, an area occupied by a cup wall of the reflective cup B is reduced, an area of a dark field is reduced, an area coved by the upper opening B2 is maximized, and the luminance and the luminance uniformity in the angle range are further improved.

In the case that both the lower opening B2 and the upper opening B3 are in the rectangular shape, the inner wall face 4031 of the cup body includes two opposite first wall sub-faces and two opposite second wall sub-faces. The two first wall sub-faces have the same shape and mirror symmetry, and the two second wall sub-faces have the same shape and mirror symmetry.

Figure 14:
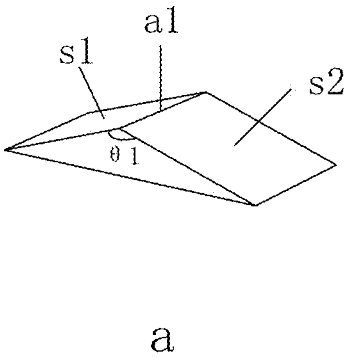
FIG. 14 is a schematic diagram of a first micro structure on a reflective cup according to an embodiment of the present disclosure.
Figure 14:
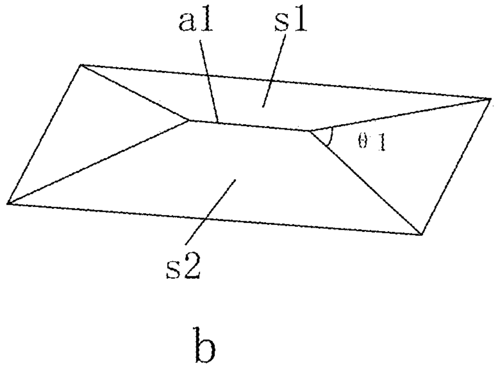
Figure 14:
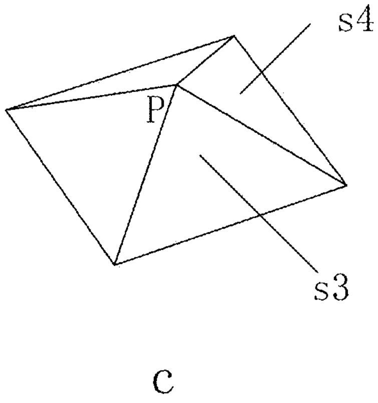
Figure 14:
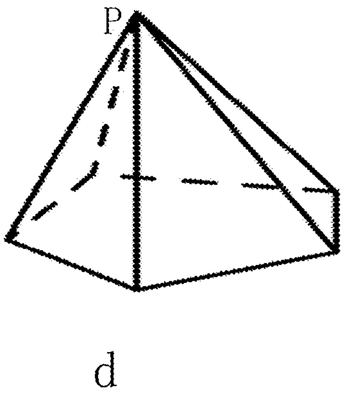
Figure 14:
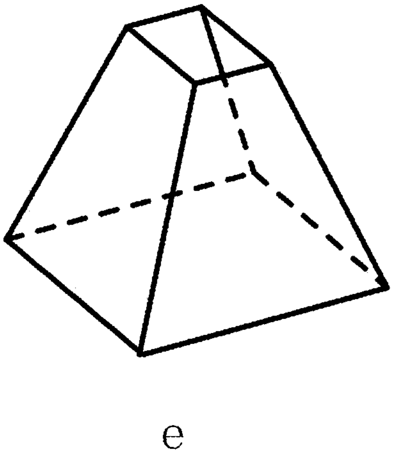

In some embodiments, as shown in diagrams a and b shown in FIG. 14, the plurality of reflective faces include a first reflective face s1 and a second reflective face s2 that share a same ridge edge al, that is, the shared edge al. The same ridge edge al (that is, the shared edge al) is an edge, distal from the inner wall face 4031 of the cup body of the reflective cup, of the first reflective face s1 and the second reflective face s2.

FIG. 13 shows a schematic structural diagram of an arrangement of a plurality of micro structures on an inner wall face of a cup body. The micro structures shown in FIG. 13 are shown in diagram a in FIG. 14. The shared edge al is not on a plane of the inner wall face 4031 of the cup body, and is not intersected with the inner wall face 4031 of the cup body.

In some embodiments, as shown in FIG. 13, in each first micro structure W1, the same ridge edge al (that is, the shared edge al of the first reflective face s1 and the second reflective face s2) is perpendicular to a boundary of the lower opening B2 of the reflective cup B or the upper opening B3 of the reflective cup B. The boundary of the upper opening B3 is in the R1 direction shown in FIG. 13, and the shared edge al of the first reflective face s1 and the second reflective face s2 is in the R2 direction shown in FIG. 13.

In some embodiments, as shown in diagrams a and b shown in FIG. 14, an included angle θ 1 between the first reflective face s1 and the second reflective face s2 is greater than or equal to 90°, and is less than 180°, and/or a length of the same ridge edge al (that is, the shared edge al of the first reflective face s1 and the second reflective face s2) is greater than or equal to 0.2 mm, and is less than or equal to 2 mm. For example, the length of the shared edge al is 0.5 mm, 0.8 mm, or 1 mm.

Figures 15, 16:
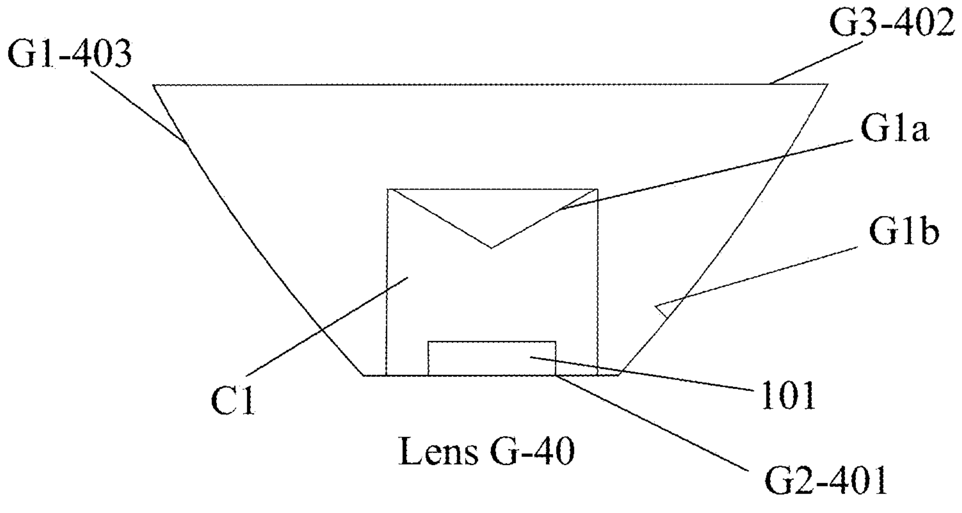
FIG. 15 is a simulated diagram of a luminance and a uniformity at an included angle according to an embodiment of the present disclosure.
FIG. 16 is a schematic diagram of another light assigning assembly according to an embodiment of the present disclosure.

FIG. 15 shows the result of the simulation of the luminance and uniformity in different included angles θ1. As shown in FIG. 15, in a range from 140° to 360°, the luminance and uniformity in the angle range of the display panel are accordingly increased with the increment of the included angle θ1. In the case that the included angle θ1 ranges from 140° to 360°, the corresponding luminance is more than 1.4 million nits, and the uniformity is above 70%. The luminance is 1.8 million nits and the uniformity is greater than 80% in the case that the included angle θ1 is 360°, and thus the display effect is greatly improved.

In practical implementations, the included angle θ1 between the first reflective face s1 and the second reflective face s2 is determined based on the difficulty in manufacturing and the actual effect. For example, the included angle θ1 between the first reflective face s1 and the second reflective face s2 is 100°, 110°, 120°, 130°, 140°, 150°, 160°, 360°, and the like, which is not limited in the present disclosure.

In some embodiments, as shown in the diagram c shown in FIG. 14, the plurality of reflective faces include a third reflective face s3 and a fourth reflective face s4 that share a same vertex P. The same vertex P is a vertex, distal from the inner wall face 4031 of the cup body of the reflective cup B, of the third reflective face s3 and the fourth reflective face s4, and the shared vertex P is a vertex, distal from the inner wall face 4031 of the cup body, of the fourth reflective face s4. The shared vertex P is not on the plane of the inner wall face 4031 of the cup body. The shared vertex P is a shared vertex P of three, four (shown in the diagram c shown in FIG. 14), or more reflective faces.

It should be noted that the first micro structure W1 is not limited to the above structures, and may include a poly pyramid structure, such as pentagram pyramid shown in the diagram d shown in FIG. 14, a poly pyramid frustum structure, such as four-pyramid frustum shown in the diagram e shown in FIG. 14, a curved surface structure, and the like.

The plurality of first micro structures W1 are closely arranged and/or arranged in an array on the inner wall face 4031 of the cup body of the reflective cup. The plurality of first micro structures W1 being closely arranged on the inner wall face 4031 of the cup body of the reflective cup indicates that the plurality of first micro structures W1 completely cover the inner wall face 4031 of the cup body. In FIG. 14, the plurality of first micro structures W1 on the inner wall face 4031 of the cup body are arranged in an array in the direction (such as the R1 direction shown in FIG. 13) parallel to the lower opening B2 (or the upper opening B3) and in the direction (such as the R2 direction shown in FIG. 13) perpendicular to the lower opening B2 (or the upper opening B3).

In practical implementations, the reflective face is further provided with a high-reflective film, such that the reflective efficiency of the reflective face is further improved, and a loss of the light is reduced. For example, a reflective rate of the high-reflective film for the emitted light is greater than or equal to 90%.

In some embodiments, the light assigning assembly 40 includes a lens G shown in FIG. 16. A lens body G1 of the lens G is the body portion 403 of the light assigning assembly, a first end G2 of the lens body G1 is the first end 401 of the light assigning assembly 40, a second end G3 of the lens body G1 is the second end 402 of the light assigning assembly 40, and the lens body G1 is a conical shell including a cavity. The cavity of the lens body G1 is a space enclosed by the conical shell, and the inner wall of the lens body G1 is a side wall proximal to the cavity.

In addition, the cavity of the lens body G1 is provided with a first quadric surface G1*a*, an inner wall of the lens body G1 is provided with a second quadric surface G1*b*. The first quadric surface G1*a* is convex toward the first end G2 of the lens body G1, and the second quadric surface G1*b* is convex toward the second end G3 of the lens body. The light from the backlight source within a first incidence angle range is collimated and emitted from the second end G3 of the lens body G1 upon being refracted by the first quadric surface G1*a*, and incidence light from the backlight source 101 within a second incidence angle range is collimated and emitted from the second end G3 of the lens body G1 upon being refracted by the second quadric surface G1*b*. A maximum angle within the first incidence angle range is less than a minimum angle within the second incidence angle range, and the first incidence angle range is an incidence angle range of light from the backlight source 101 directly emitted from the second end G3 of the lens body G1 without being reflected by the inner wall of the lens body G1.

The lens body G1 is a cup-shaped shell, and is generally a conical shell. The lens body G1 is one of a glass reflective cup, and is made by a single demolding process. In the case that the lens body G1 is the conical shell, a diameter of the first end G2 of the lens body G1 is less than the second end G3 of the lens body. As such, the backlight source 101 is disposed on the first end G2 of the lens body G1, such that the light from the backlight source 101 is emitted through the second end G3 of the lens body.

In the embodiments of the present disclosure, for improvement of the collimation of the emitted light, the first quadric surface G1*a* is provided in the cavity of the lens body G1, and the second quadric surface G1*b* is provided in the inner wall of the lens body G1. Both the first quadric surface G1*a* and the second quadric surface G1*b* are any one of quadric surface, such as a spherical face, an ellipsoidal spherical face, and an ellipsoidal paraboloid face, and the quadric surface is a curved surface represented by a ternary quadratic equation. That is, a curved surface represented by a ternary quadratic equation in a three-dimensional coordinate system is referred to as a corresponding figure of the quadric surface.

As shown in FIG. 16, the first quadric surface G1*a* is convex toward the first end G2 of the lens G, and the backlight source 101 is disposed on the first end G2 of the lens body G1. That is, the first quadric surface G1*a* is convex toward a light emitting face of the backlight source 101. As such, the light from the backlight source 101 within the first incidence angle range is refracted upon passing through the first quadric surface G1*a*, and is collimated and emitted from the second end G3 of the lens body G1.

Figure 17:
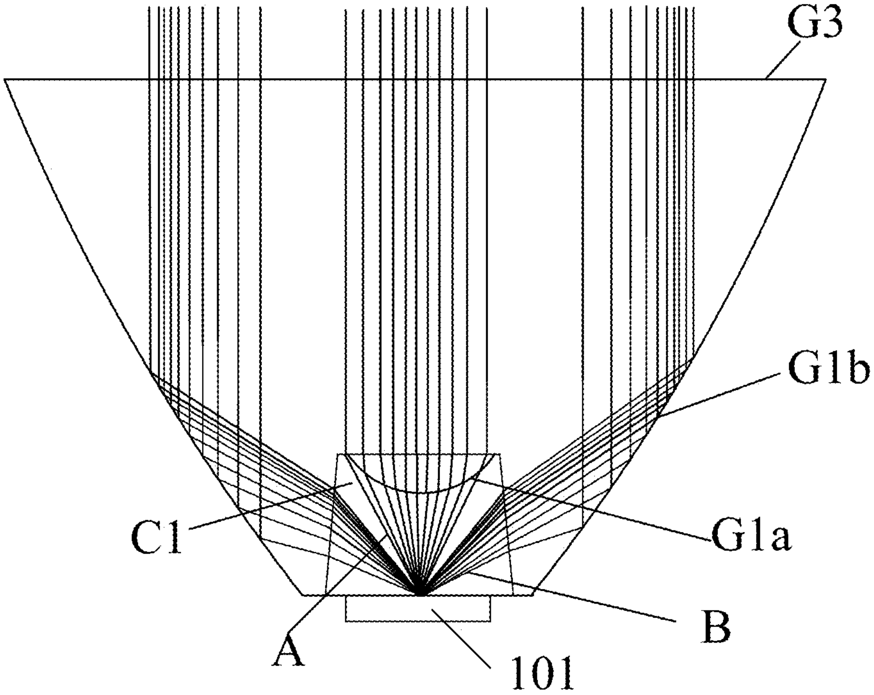
FIG. 17 is a schematic diagram of emitting light on the basis of FIG. 16.

It should be noted that the first incidence angle range is an incidence angle range of the light from the backlight source 101 directly emitted without being reflected by the inner wall of the lens body G1. The first incidence angle range is determined based on a shape and a size of the cavity of the lens body G1, which is not limited in the embodiments of the present disclosure. It should be noted that the light of the collimation and emitting is the light that an included angle between the emitted light and the axis line of the lens body G1 is converged within ±15° upon being refracted by the first quadric surface G1*a*. The light from the backlight source 101 within the first incidence angle range is the light marked by A in FIG. 17.

The second quadric surface G1*b* is convex toward the second end of the lens, and the second end G3 of the lens body G1 is an end, emitting the light, of the lens body G1. That is, the first quadric surface G1*a* is convex toward a light emitting face of the backlight source 101. As such, the light from the backlight source 101 within the second incidence angle range is refracted on the second quadric surface G1*b* upon passing through the second quadric surface G1*b*, and is collimated and emitted from the second end G3 of the lens body G1.

It should be noted that the light within the second incidence angle range is an incidence angle range of the light without the first incidence angle range.

Figure 18:
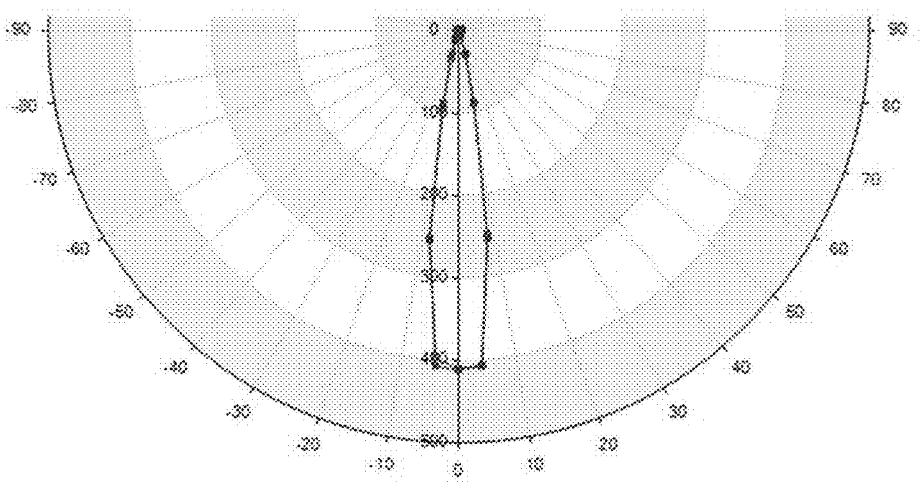
FIG. 18 is a section of a strength according to an embodiment of the present disclosure.

It should be noted that the light of the collimation and emitting is the light that an included angle between the emitted light and the axis line of the lens body G1 is converged within ±15° upon being refracted by the second quadric surface G1*b*. The light from the backlight source 101 within the first incidence angle range is the light marked by A in FIG. 17. An intensity section of the lens is shown in FIG. 18. According to FIG. 18, the display luminance of the lens is converged within ±15° in 10% of a vertical center angle, and the collimation of the light passing through the lens is improved.

In addition, the backlight source 101 on the first end G2 of the lens body G1 is one of light emitting diodes, and the backlight source 101 is disposed on the axis line of the lens body G1, such that the light from the backlight source 101 is assigned on two sides of the axis line of the lens body G1.

It can be seen from the above embodiments that in the embodiments of the present disclosure, as the first quadric surface G1*a* is provided in the cavity of the lens body G1, the second quadric surface G1*b* is provided in the inner wall of the lens body G1, the first quadric surface G1*a* is convex toward the first end G2 of the lens body G1, and the second quadric surface G1*b* is convex toward the second end G3 of the lens body, the light from the backlight source 101 within the first incidence angle range is refracted upon passing through the first quadric surface G1*a*, and is collimated and emitted from the second end G3 of the lens body G1, and the light from the backlight source 101 within the second incidence angle range is refracted on the second quadric surface G1*b* upon passing through the second quadric surface G1*b*, and is collimated and emitted from the second end G3 of the lens body G1. In addition, as the maximum angle within the first incidence angle range is less than the minimum angle within the second incidence angle range, and the first incidence angle range is the incidence angle range of light from the backlight source 101 directly emitted from the second end G3 of the lens body G1 without being reflected by the inner wall of the lens body G1, all light emitted from the backlight source 101 is collimated and emitted upon being adjusted. Therefore, an energy loss of the backlight source 101 is avoided.

Figure 19:
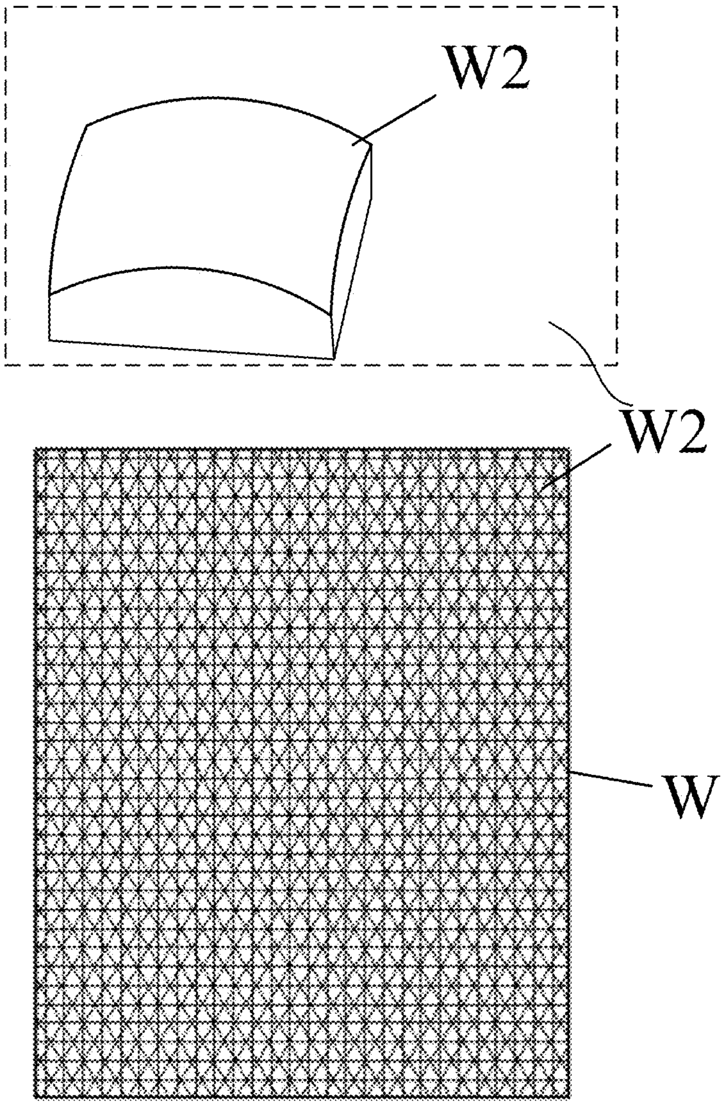
FIG. 19 is a schematic diagram of a second micro structure on a lens according to an embodiment of the present disclosure.

In some embodiments, it can be seen referring to FIG. 19 that an end face of the second end G3 of the lens body G1 is provided with a micro structure array W. The micro structure array W includes a plurality of second micro structures W2 arranged in an array. A face, distal from the backlight source 101, of each of the plurality of second micro structures W2 is an arc face.

It should be noted that each second micro structure W2 is equivalent to a block structure, and a top portion of the block structure is an arc face. That is, a face, distal from the backlight source 101, of the block structure is any arc face, such as a spherical face, a half arc face, and the like, which is not limited in the embodiments of the present disclosure. The arc face is convex toward a direction away from the backlight source 101. Each two adjacent second micro structures W2 are closely arranged. In the case that a number of the second micro structures W2 on the end face of the second end G3 of the lens body G1 is up to a specific number, the uniformity of the end face of the second end of the lens body G1 tends to be uniform.

A light source utilization rate of each of the plurality of second micro structures is greater than 90%. It should be noted that the simulation calculation is performed based on the curvature of the face of each second micro structure W2 distal from backlight 101, and a result of a minimum normalized variance is acquired. In the case that the curvature is 0.4358, the light source utilization rate of each second micro structure W2 is greater than 90%. As such, a probability of light passing through the second micro structure W2 array is improved, and the display luminance of the lens is improved.

A distance between each two adjacent second micro structures W2 is less than or equal to 1 mm. It should be noted that in the case that the distance between each two adjacent second micro structures W2 tends to be 1 mm, the uniformity of the end face of the second end G3 of the lens body G1 is greater than 60%.

Figure 20:
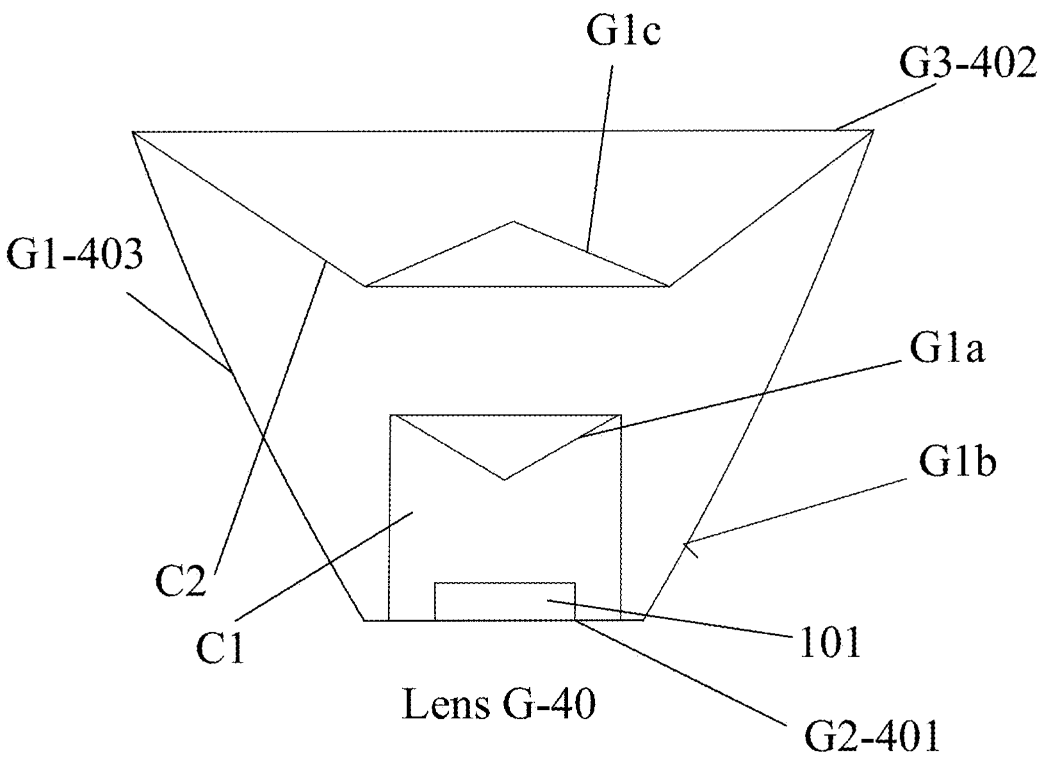
FIG. 20 is a schematic diagram of another light assigning assembly according to an embodiment of the present disclosure.

In some embodiments, it can be seen referring to FIG. 20 that in the embodiments of the present disclosure, the cavity C1 of the lens body G1 is provided with a third quadric surface G1*c*. The third quadric surface G1*c* is convex toward the second end G3 of the lens body G1 and is disposed on a side, distal from the first end G2 of the lens body G1, of the first quadric surface G1*a*, and an orthogonal projection of the third quadric surface G1*c* on the liquid crystal display module is overlapped with an orthogonal projection of the first quadric surface G1*a* on the liquid crystal display module. The light from the backlight source 101 within the first incidence angle range is collimated and emitted from the second end G3 of the lens body G1 through the third quadric surface G1*c* upon being refracted by the first quadric surface G1*a*. As such, all light emitted from the backlight source 101 is collimated and emitted upon being adjusted, and the energy loss of the backlight source 101 is avoided.

Figure 21:
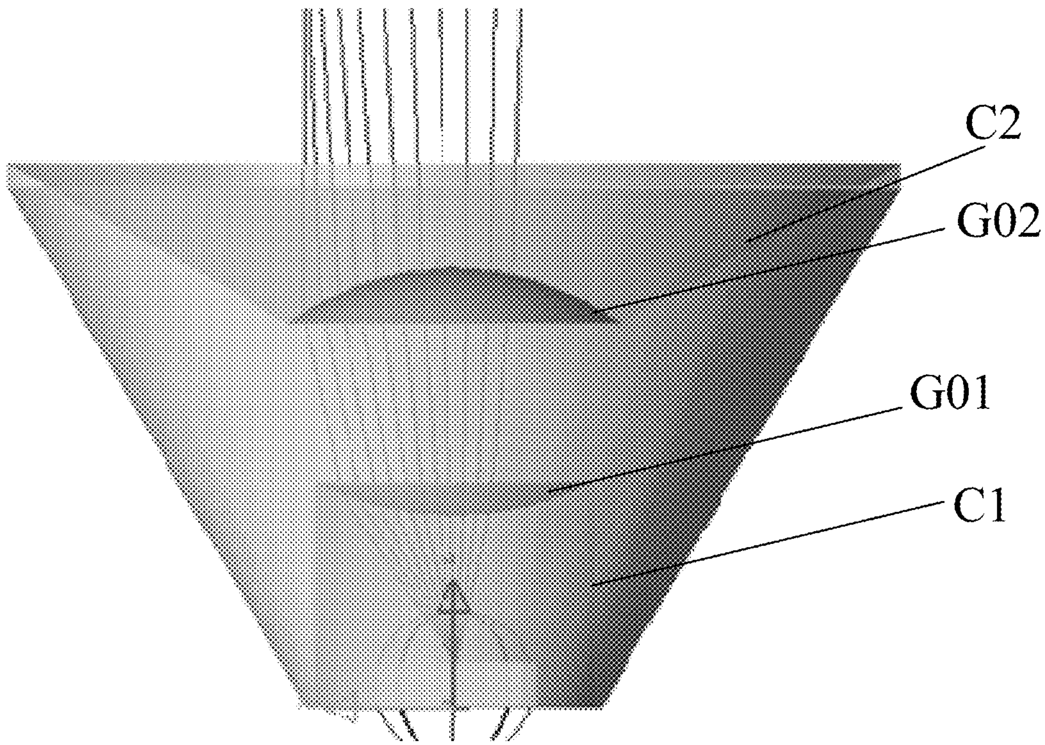
FIG. 21 is a schematic diagram of emitting light on the basis of FIG. 20.

In some embodiments, by taking FIG. 20 as an example, FIG. 21 shows a space diagram. In conjunction with FIG. 20 and FIG. 21, it can be seen that the orthogonal projection of the third quadric surface G1*c* on the liquid crystal display module covers the orthogonal projection of the first quadric surface G1*a* on the liquid crystal display module.

In some embodiments, it can be seen in conjunction with FIG. 21 that the lens G includes a first curved lens G01, a first fixed cavity C1, a second curved lens G02, and a second fixed cavity C2.

A first end of the first fixed cavity C1 is affixed on the first end of the lens body G1, the first curved lens G01 is affixed on a second end of the first fixed cavity C1, and a convex surface of the first curved lens G01 forms the first quadric surface G1*a*. A first end of the second fixed cavity C2 is affixed on the second end G3 of the lens body G1, the second curved lens G02 is affixed on a second end of the second fixed cavity C2, and a convex surface of the second curved lens G02 forms the third quadric surface G1*c*.

It should be noted that in conjunction with FIG. 21, the first curved lens G01, the first fixed cavity C1, the second curved lens G02, and the second fixed cavity C2 are formed by integrated injection molding, and the fixed cavity is formed between the backlight source 101 and the lens body G1, such that the curved lens is affixed through the fixed cavity, and the incident light from the backlight source within the first incidence angle range is propagated through the fixed cavity. In addition, based on the fixed cavity, the incident light from the backlight source within the second incidence angle range is refracted in passing through a cavity wall of the fixed cavity. In the case that the thickness of the cavity wall is ignored, the refraction of the incident light from the backlight source within the second incidence angle range in passing through the cavity wall of the fixed cavity is also ignored, and the reflection of the light by the second quadric surface G1*b* is not affected.

In some embodiments, both a focus of the first quadric surface G1*a* and a focus of a third quadric surface G1*c* are on a side of a second face of the backlight source 101, and the second face of the backlight source 101 is the light exiting face of the backlight source; and/or, the second quadric surface surrounds the backlight source 101, a focus of the second quadric surface is on a side of a first face of the backlight source 101, and the first face of the backlight source 101 is a face opposite to the light exiting face of the backlight source 101.

It should be noted that the second quadric surface G1*b* is one of the ellipsoidal paraboloid faces, and surrounds the backlight source 101. As such, in the case that the focus of the second quadric surface G1*b* is disposed on a side of the first face of the backlight source 101, the incident light from the backlight source 101 within the second incidence angle range is emitted through the second quadric surface G1*b*. That is, in the case that the focus of the second quadric surface G1*b* is on a bottom of the backlight source 101, the incident light from the backlight source 101 within the second incidence angle range is irradiated to the quadric surface, such that the energy loss of the backlight source 101 is avoided.

It should be noted that as the focus of the first quadric surface G1*a* is on the side of the second face of the backlight source 101, a distance is present between the backlight source 101 and the first quadric surface G1*a*. As such, the light from the backlight source 101 is irradiated to the first quadric surface G1*a* within the first incidence angle range Upon passing through the cavity between the backlight source 101 and the first quadric surface G1*a*, and is then refracted through the second quadric surface G1*b*. As a refraction angle of light is less than an incidence angle in irradiating from air into other media, the propagation direction of light is changed. In the case that the distance between the focus of the first quadric surface G1*a* and the second face of backlight source 101 is determined, the light emitted from the second quadric surface G1*b* is directly collimated and emitted.

In some embodiments, the focus of the first quadric surface G1*a* and the focus of the third quadric surface G1*c* are coincided on the side of the second face of the backlight source.

In some embodiments, a first distance between the focus of the second quadric surface and the backlight source ranges from 1 mm to 4 mm.

It should be noted that in the case that the distance between the focus of the second quadric surface G1*b* and the backlight source 101 ranges from 1 mm to 4 mm, incident light from the backlight source 101 within the second incidence angle range is emitted from the second quadric surface G1*b*.

In some embodiments, the distance between the focus of the second quadric surface G1*b* and the backlight source 101 is 2 mm, a curved surface coefficient of the second quadric surface G1*b* is −1.22, and a curvature is 0.35. Thus, an angle at which the light emitted from the backlight source 101 reaches the second quadric surface G1*b* is equal to the included angle between the light emitted upon collimation and the normal line, such that the collimation of the light reflected by the second quadric surface G1*b* is further improved.

And/or, a second distance between the focus of the first quadric surface G1*a* and the second face of the backlight source 101 is greater than one-third of a distance between the first end G2 of the lend body G1 and the second end G3 of the lens body G1.

It should be noted that the distance between the focus of the first quadric surface G1*a* and the second face of the backlight source 101 is greater than one-third of the distance between the first end G2 of the lend body G1 and the second end G3 of the lens body G1, such that the angle of the reflection on the first quadric surface G1*a* is kept at a specific value. That is, the angle of the light reaching the first quadric surface G1*a* is adjusted based on the distance between the focus of the first quadric surface G1*a* and the second face of the backlight source 101, such that the light emitted from the second quadric surface G1*b* is collimated and emitted.

It should be further noted that the distance between the focus of the first quadric surface G1*a* and the second face of the backlight source 101 is determined based on the distance between the first end G2 of the lend body G1 and the second end G3 of the lens body G1. For example, in the case that the distance between the first end G2 of the lend body G1 and the second end G3 of the lens body G1 is 7 mm, the distance between the focus of the first quadric surface G1*a* and the second face of the backlight source 101 is 3 mm, which is not limited in the embodiments of the present disclosure.

And/or, a third distance between a focus of the third quadric surface G1*c* and the second face of the backlight source 101 is greater than half of the distance between the first end of the lend body G1 and the second end of the lens body G1, and a distance between the third quadric surface G1*c* and the second end G3 of the lens body G1 is less than a distance between the first quadric surface G1*a* and the first end G2 of the lens body G1.

In some embodiments, each the first quadric surface, the second quadric surface, the third quadric surface includes any one of a spherical face, an ellipsoidal spherical face, and an ellipsoidal paraboloid face.

It can be seen from the above embodiments that in the embodiments of the present disclosure, as the first quadric surface G1*a* is provided in the cavity of the lens body G1, the second quadric surface G1*b* and the third quadric surface G1*c* are provided in the inner wall of the lens body G1, the first quadric surface G1*a* is convex toward the first end G2 of the lens body G1, the second quadric surface G1*b* is convex toward the second end G3 of the lens body G1, and the third quadric surface G1*c* is convex toward the second end G3 of the lens body G1, the light from the backlight source 101 within the first incidence angle range is refracted upon passing through the first quadric surface G1*a*, and is collimated and emitted from the second end G3 of the lens body G1 upon passing through the third quadric surface G1*c*, and the light from the backlight source 101 within the second incidence angle range is refracted on the second quadric surface G1*b* upon passing through the second quadric surface G1*b*, and is collimated and emitted from the second end G3 of the lens body G1. In addition, as the maximum angle within the first incidence angle range is less than the minimum angle within the second incidence angle range, and the first incidence angle range is the incidence angle range of light from the backlight source 101 directly emitted from the second end of the lens body without being reflected by the inner wall of the lens body, all light emitted from the backlight source 101 is collimated and emitted upon being adjusted. Therefore, an energy loss of the backlight source 101 is avoided.

Figure 22:
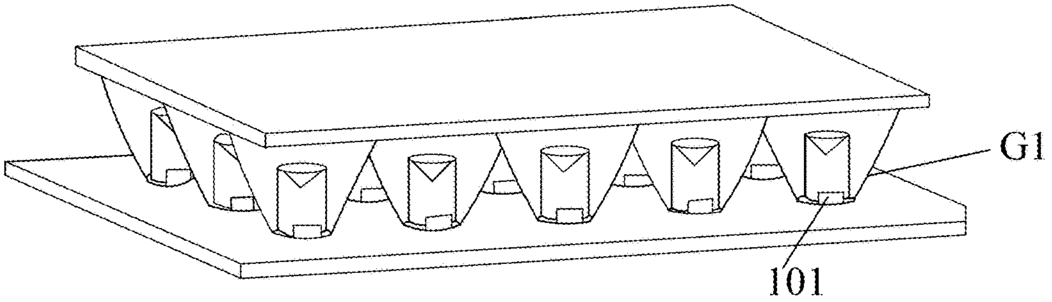
FIG. 22 is a schematic diagram of a lens array according to an embodiment of the present disclosure.
Figure 23:
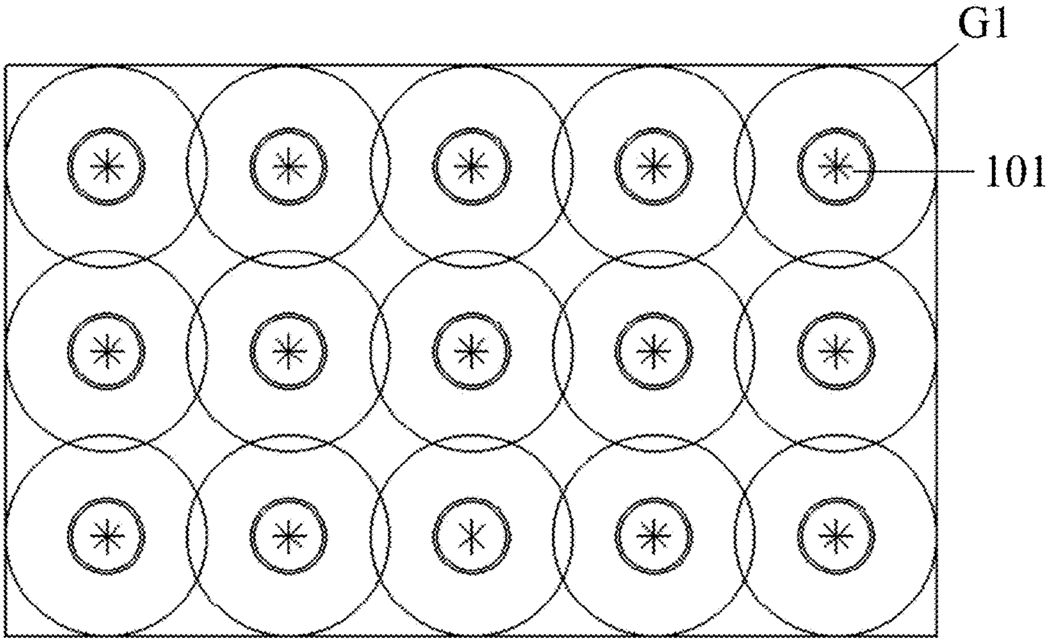
FIG. 23 is a schematic diagram of another lens array according to an embodiment of the present disclosure.

In some embodiments, as shown in FIG. 22 and FIG. 23, the light assigning assembly 40 in the embodiments of the present disclosure is a lens, and a lens array is shown by taking a plurality of light assigning assemblies 40 as an example. The lens array includes a plurality of lenses G1 in the above embodiments, and the plurality of lenses G1 are arranged in a predetermined array. The predetermined array is an array forming the lens array with a display size.

Figure 24:
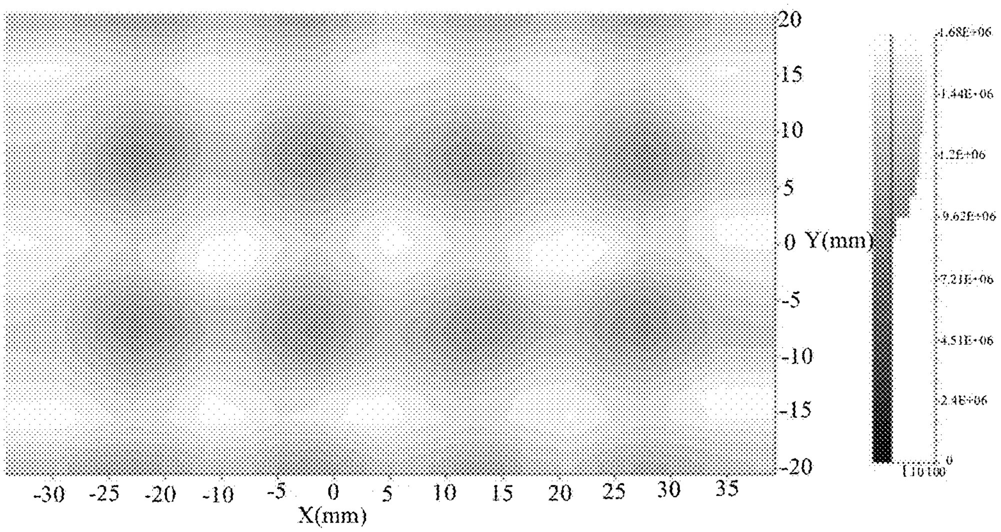
FIG. 24 is a simulated diagram of a luminance according to an embodiment of the present disclosure.

It should be noted that the predetermined array is an array meeting the display size of the lens array. For example, in the case that the display size of the lens array is a display size of 45 mm*75 mm, the lenses G1 are arranged in a 5*3 array. That is, the lens array is arranged in five rows and three columns. As shown in FIG. 24, based on the final simulation result of the lens array, the average luminance is 2.61 million nits, the power consumption is 12 W, and the uniformity is greater than 56%. Compared with the reflective cup, the light efficiency is improved by 2.8 times. The predetermined array of the lens array is determined based on the display size of the lens array, which is not limited in the embodiments of the present disclosure.

It can be seen from above embodiments that in the embodiments of the present disclosure, as the plurality of lens G1 is arranged in the predetermined array, the display luminance of the lens array is improved, and the effect of the lens array is improved in the case that all light emitted from a light emitting element of each lens G1 is collimated and emitted upon being adjusted, and 100% of the light is used.

Figure 25:
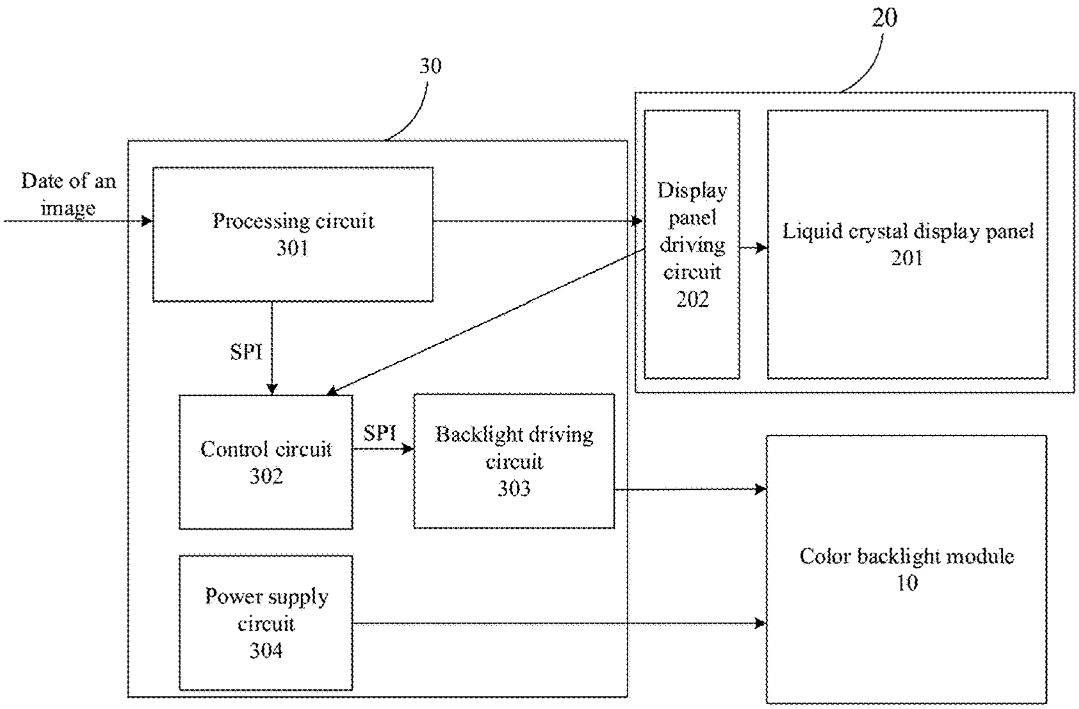
FIG. 25 is a schematic structural diagram of another display module according to an embodiment of the present disclosure.

FIG. 25 is a schematic structural diagram of another display module according to an embodiment of the present disclosure. As shown in FIG. 25, the driving apparatus 30 may include a processing circuit 301, a control circuit 302, a backlight driving circuit 303 and a power supply circuit 304. The liquid crystal display module 20 may further include a display panel driving circuit 202.

Here, the processing circuit 301 may be connected to the display panel driving circuit 202 and the control circuit 302 respectively and configured to receive image data, i.e., image signal(s), and may transmit one or more initial driving signal(s) to the display panel driving circuit 202 and the control circuit 302 based on the image data.

For example, referring to FIG. 25, the processing circuit 301 may be connected to the control circuit 302 by a serial peripheral interface (SPI). The display panel driving circuit 202 may further be connected to the control circuit 302. The processing circuit 301 may process the received image data into a field sequence signal corresponding to the light-emitting elements of different colors, and transmit an initial driving signal carrying the field sequence signal to the display panel driving circuit 202. Then, the display panel driving circuit 202 transmits an initial driving signal including a frame starting signal to the control circuit 302. Alternatively, the processing circuit 301 may directly transmit the initial driving signal to the control circuit 302. The control circuit 302 may start to work under the control of the initial driving signal, e.g., start to drive the connected circuits to work.

The display panel driving circuit 202 may further be connected to the liquid crystal display panel 201. The display panel driving circuit 202 may be configured to drive the liquid crystal molecules included in the liquid crystal display panel 201 to turn over under the control of the initial driving signal.

For example, the display panel driving circuit 202 may charge the pixel electrode of each pixel included in the liquid crystal display panel 201 under the control of the initial driving signal. Therefore, the liquid crystal molecules may be turned over under the driving of the voltage difference between the pixel electrode and the common electrode.

The control circuit 302 may further be connected to the backlight driving circuit 303 and configured to transmit a backlight driving signal to the backlight driving circuit 303 under the control of the initial driving signal.

The backlight driving circuit 303 may further be connected to the color backlight module 10 and configured to drive the backlight sources 101 included in the color backlight module 10 to emit light under the control of the backlight driving signal.

For example, referring to FIG. 25, the control circuit 302 may be connected to the backlight driving circuit 303 via the SPI. Upon receiving the initial driving signal, the control circuit 302 may start to control the backlight driving circuit 303 to drive, according to a specified time sequence, the backlight sources in the color backlight module 10 to emit light. The control principle is to identify a frame/row signal carried by the initial driving signal and to control the backlight driving circuit 303 to turn on the light-emitting elements L1 of different colors.

Optionally, the specified time sequence may be preset in the control circuit 302. For example, the specified time sequence may be the time sequence shown in FIG. 4.

The power supply circuit 304 may be connected to the color backlight module 10 and configured to power the color backlight module 10.

Optionally, the processing circuit 301 may also be referred to as a processing system. The control circuit 302 may be a micro control unit (MCU). The light-emitting elements L1 described in the embodiments of the present disclosure may be light emitting diodes (LEDs), and correspondingly, the backlight driving circuit 303 may also be referred to as an LED driver integrated circuit (LED driver IC). The power supply circuit 304 may include a direct current (DC)-DC converter. The display panel driving circuit 202 may be a driver IC.

Optionally, the driving apparatus 30 including the above circuits may be disposed independently of the liquid crystal display module 20. The display panel driving circuit 202 and the liquid crystal display panel 201 may be integrated together. In this way, the driving apparatus 30 may also be referred to as a driving system.

Optionally, with reference to FIG. 3, each backlight source 101 described in the embodiments of the present disclosure may include a light-emitting element L1 of a first color, a light-emitting element L1 of a second color and a light-emitting element L1 of a third color.

Figure 26:
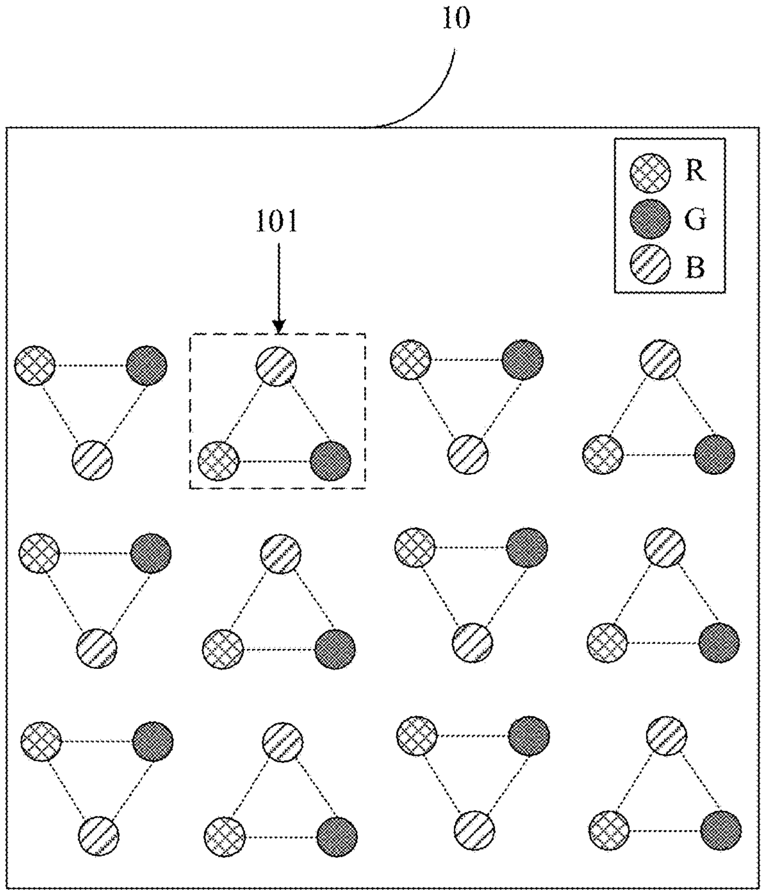
FIG. 26 is a schematic structural diagram of a backlight source according to an embodiment of the present disclosure.

Optionally, it can be seen based on FIG. 3 by combining the structural diagram of the backlight sources shown in FIG. 26 that the three light-emitting elements L1 in each backlight source 101 may be arranged in a triangle pattern. In addition, in each backlight subarea, any two adjacent light-emitting elements L1 may be of different colors. In this way, the color crosstalk challenge may be further avoided or alleviated.

Figure 27:
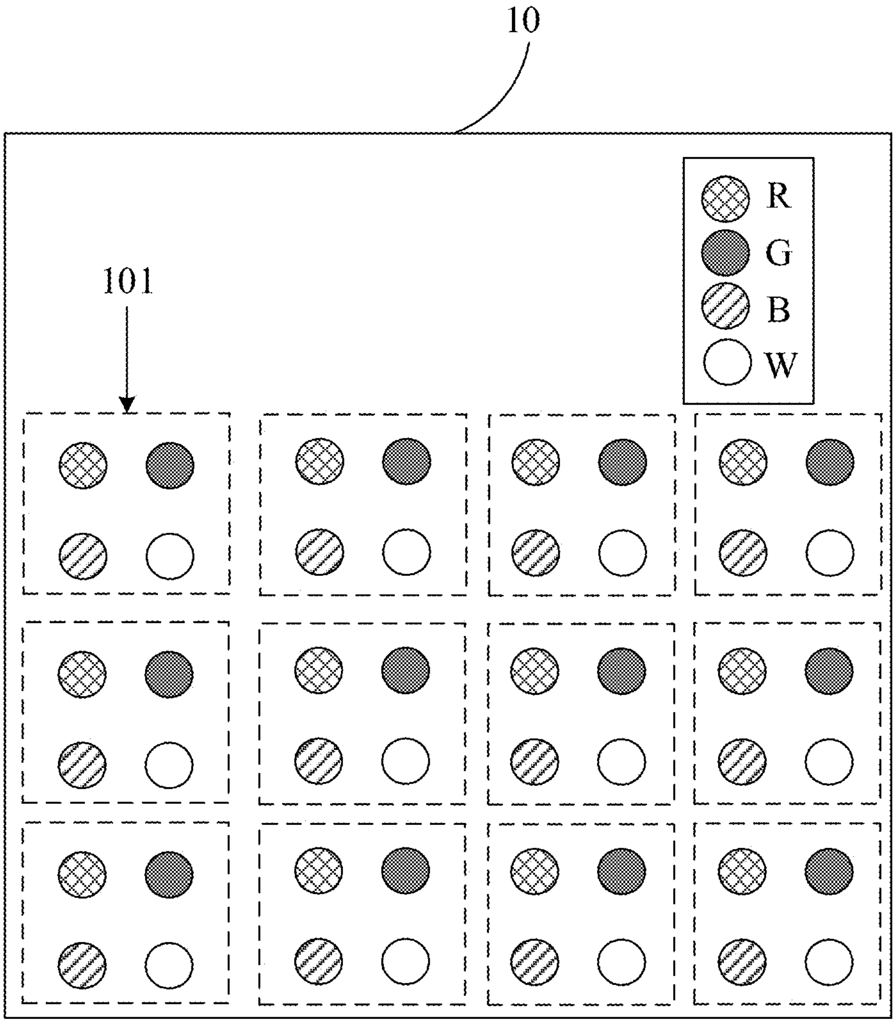
FIG. 27 is a schematic structural diagram of another backlight source according to an embodiment of the present disclosure.

Optionally, with reference to the backlight sources shown in FIG. 27, each backlight source 101 described in the embodiments of the present disclosure may further include a light-emitting element L1 of a fourth color.

Optionally, still referring to FIG. 27, the four light-emitting elements L1 in each backlight source 101 may be arranged in a rectangle pattern. In addition, in each backlight subarea, any two adjacent light-emitting elements L1 are of different colors.

Optionally, the first color may be red, the second color may be green, the third color may be blue, and the fourth color may be white (W). The addition of the white light-emitting element L1 can improve the overall light efficiency of the backlight sources 101.

In some embodiments, for the structure shown in FIG. 26, the three light-emitting elements L1 included in each backlight source 101 may also be arranged in other patterns, e.g., a circle pattern. For the structure shown in FIG. 27, the four light-emitting elements L1 included in each backlight source 101 may also be arranged in other patterns, e.g., a trapezoid pattern.

Figure 28:
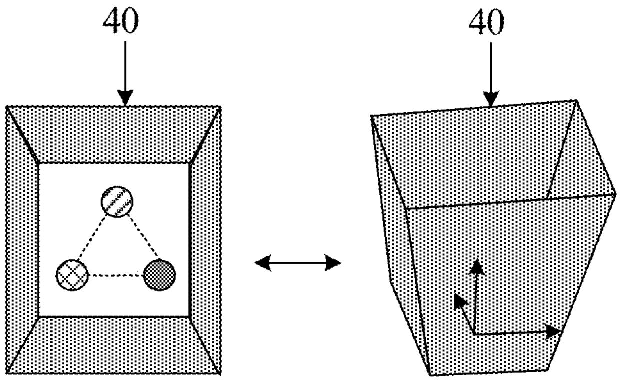
FIG. 28 is a schematic structural diagram of a reflective cup and a backlight source according to an embodiment of the present disclosure.
Figure 29:
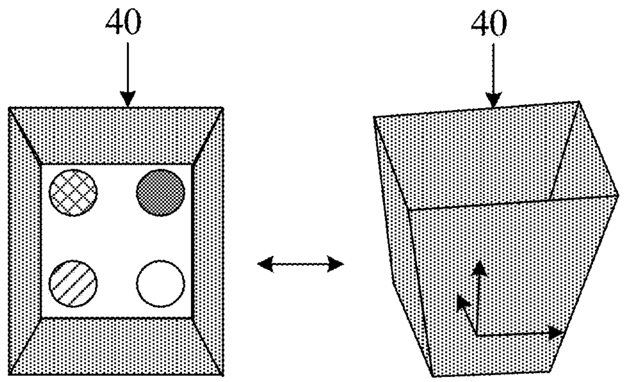
FIG. 29 is a schematic structural diagram of another reflective cup and another backlight source according to an embodiment of the present disclosure.

Illustratively, by taking the light assigning assembly 40 being the reflective cup as an example, FIG. 28 is a schematic structural diagram of a light assigning assembly 40 disposed with a backlight source 101 on the basis of FIG. 26, and FIG. 29 is a schematic structural diagram of a light assigning assembly 40 not disposed with a backlight source 101 on the basis of FIG. 27. In FIG. 28 and FIG. 29, arrows in the light assigning assembly 40 indicate the light-emitting directions of the light-emitting elements L1. As such, the display effect is improved by additionally providing the light assigning assembly 40.

In some embodiments of the present disclosure, the light-emitting elements L1 of multiple colors in each backlight source 101 are integrated on a same chip, which is referred to as a LED chip. As such, the display effect is great. In some embodiments, the light-emitting elements L1 of multiple colors are separated.

Figure 30:
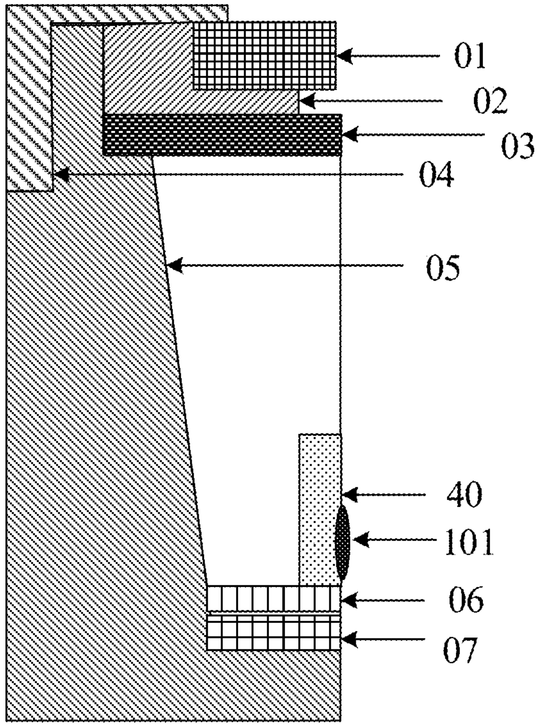
FIG. 30 is a section diagram of a display module according to an embodiment of the present disclosure.

In an example, FIG. 30 shows a schematic sectional view of a display module including both the liquid crystal display module 20 and the color backlight module 10. As shown in FIG. 30, the display module may include a substrate 01 that may be a color-film-less glass substrate; a foam frame 02 for support and fixation; a diffuser plate 03 that may be configured to prevent a lamp shadow (it is unnecessary to dispose the diffuser plate 03 if the light assigning assembly 40 can effectively improve the display effect); a bezel 04 configured to embed and fix glass; a back cover 05 that is a major backlight structure; a light assigning assembly 40 that may be configured to realize the collimation of the backlight; an LED that is the backlight source 101; an LED power lead 06; and a thermal tape 07.

Optionally, according to the above descriptions of the display module, it can be known that in the embodiments of the present disclosure, the color backlight module 10 may be a direct-type backlight module, which can further improve the display effect.

In some other embodiments, the color backlight module 10 may otherwise be a side-type backlight module.

Optionally, with reference to FIGS. 2 and 3, an equal number of backlight sources 101 may be provided in each backlight subarea described in the embodiments of the present disclosure. In other words, each display subarea includes an equal number of pixels, which can further improve the display effect.

Optionally, in some embodiments of the present disclosure, the driving apparatus 30 may further be configured to drive, in the $i^{th}$ driving process, at least one light-emitting element L1 of a different color than the $i^{th}$ color in each backlight source 101 to emit light. Or, the driving apparatus 30 may further be configured to drive, in the $i^{th}$ driving process, each light-emitting element L1 of a different color than the $i^{th}$ color in each backlight source 101 to emit light. That is, when light-emitting elements L1 of at least one color are driven to emit light, light-emitting elements L1 of one or more different colors than the at least one color are also driven to emit light at the same time.

Here, the luminance of the light-emitting elements L1 of the $i^{th}$ color may be higher than the luminance of each of the light-emitting elements L1 of other colors which are turned on at the same time. In this way, the display luminance can be improved while the color crosstalk is avoided, which further improves the display effect of the display module.

Figure 31:
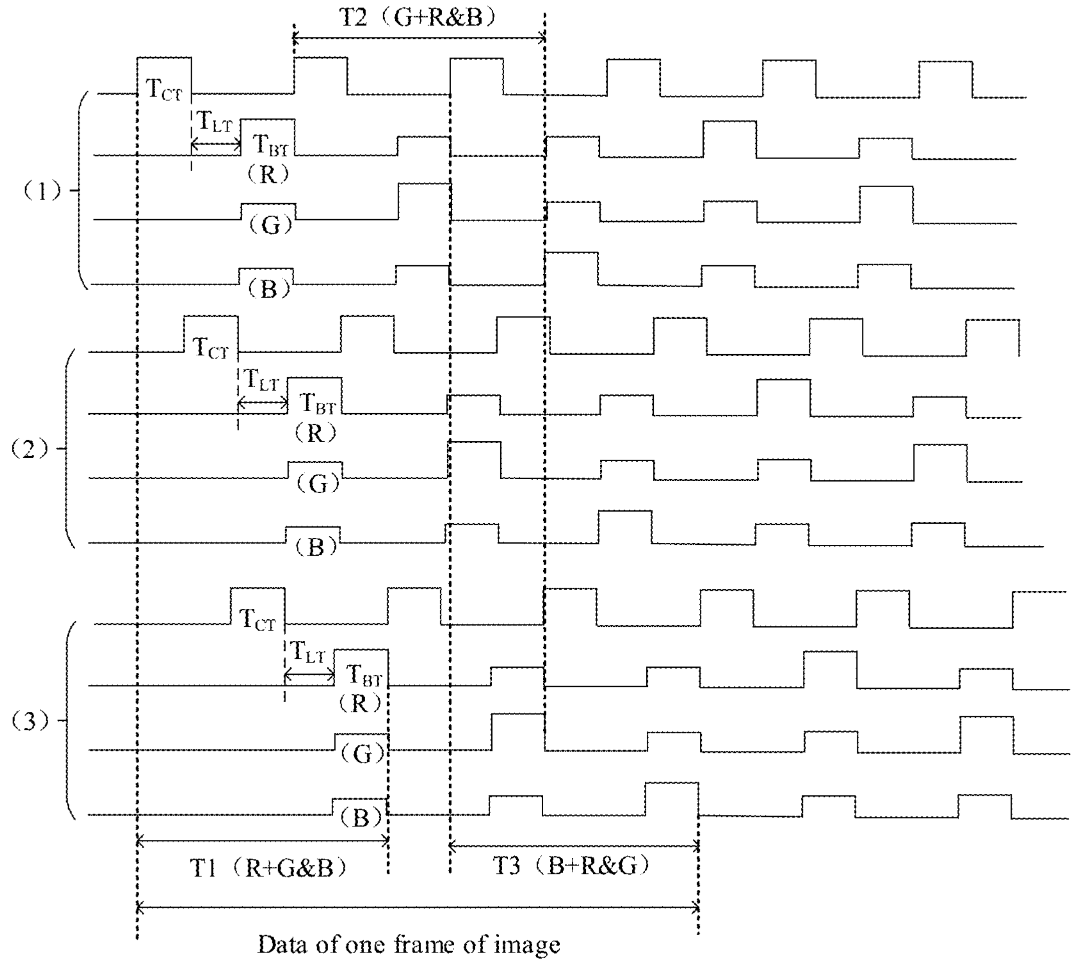
FIG. 31 is another driving time sequence diagram according to an embodiment of the present disclosure.

An example is provided by taking the display module shown in FIG. 26 as an example, where the first color is red, the second color is green, and the third color is blue; and in the $i^{th}$ driving process, each light-emitting element L1 of a different color than the $i^{th}$ color in each backlight source 101 is driven to emit light. FIG. 31 shows another driving time sequence diagram for this example.

As shown in FIG. 31, the driving apparatus 30 may sequentially execute three driving processes T1, T2 and T3 after receiving data of one frame of image. It is assumed that the light-emitting elements L1 of the first color driven by the driving apparatus 30 in the first driving process T1 are red light-emitting elements, the light-emitting elements L1 of the second color driven by the driving apparatus 30 in the second driving process T2 are green light-emitting elements, and the light-emitting elements L1 of the third color driven by the driving apparatus 30 in the third driving process T3 are blue light-emitting elements. Referring to FIG. 31, in the first driving process T1, when driving the red light-emitting elements L1 included in the respective backlight sources 101 to emit light, the driving apparatus 30 may simultaneously drive the green light-emitting elements L1 and the blue light-emitting elements L1 included in the respective backlight sources 101 to emit light. In the second driving process T2, when driving the green light-emitting elements L1 included in the respective backlight sources 101 to emit light, the driving apparatus 30 may simultaneously drive the red light-emitting elements L1 and the blue light-emitting elements L1 included in the respective backlight sources 101 to emit light. In the third driving process T3, when driving the blue light-emitting elements L1 included in the respective backlight sources 101 to emit light, the driving apparatus 30 may simultaneously drive the red light-emitting elements L1 and the green light-emitting elements L1 included in the respective backlight sources 101 to emit light. That is, the green and blue colors are also added to the R picture, the red and blue colors are also added to the G picture, and the red and green colors are also added to the B picture.

It should be noted that the luminance of the light-emitting element L1 may be positively correlated to the magnitude of a potential transmitted by the driving apparatus 30. That is, the higher the potential is, the higher the luminance is; and the lower the potential is, the lower the luminance is. Thus, it can be seen from FIG. 12 that in the first driving process T1, the potential transmitted by the driving apparatus 30 to the red light-emitting element L1 is greater than the potential transmitted by the driving apparatus 30 to the green light-emitting element L1 and is greater than the potential transmitted by the driving apparatus 30 to the blue light-emitting element L1. In this way, it is ensured that the luminance of the red light-emitting element L1 is higher than the luminance of the green light-emitting element L1 and the luminance of the blue light-emitting element L1 in the first driving process T1. The second driving process T2 and the third driving process T3 are similar to the first driving process T1, and these processes are not repeated here.

Therefore, it can be determined from the time sequence diagram shown in FIG. 31 that the display luminance Lu of one frame of image may meet the following equation:

$$Lu=(Lr1*T_{BT}+Lg1*T_{BT}+Lb1*T_{BT})+(Lr2*2*T_{BT}+Lg2*2*T_{BT}+Lb2*2*T_{BT})=Lr1*T_{BT}+Lr2*2*T_{BT}+Lg1*T_{BT}+Lg2*2*T_{BT}+Lb1*T_{BT}+Lb2*2*T_{BT},$$

in which Lr1 indicates the luminance of the red light-emitting element L1; Lr2 indicates the luminance of the red light-emitting element L1 in the case that the green light-emitting element L1 and the blue light-emitting element L1 are also driven to emit light when the red light-emitting element L1 is driven to emit light; Lg1 indicates the luminance of the green light-emitting element L1; Lg2 indicates the luminance of the green light-emitting element L1 in the case that the red light-emitting element L1 and the blue light-emitting element L1 are also driven to emit light when the green light-emitting element L1 is driven to emit light; Lb1 indicates the luminance of the blue light-emitting element L1; Lb2 indicates the luminance of the blue light-emitting element L1 in the case that the red light-emitting element L1 and the green light-emitting element L1 are also driven to emit light when the blue light-emitting element L1 is driven to emit light; $Lr1*T_{BT}+Lg1*T_{BT}+Lb1*T_{BT}$ indicates the display luminance of one frame of image corresponding to the time sequence diagram shown in FIG. 4; and $Lr2*2*T_{BT}+Lg2*2*T_{BT}+Lb2*2*T_{BT}$ indicates the newly added display luminance corresponding to the turned-on light-emitting elements L1 of various other colors. Therefore, it can be determined that the display luminance can be effectively improved by performing the driving and displaying according to the time sequence diagram shown in FIG. 31.

Figure 32:
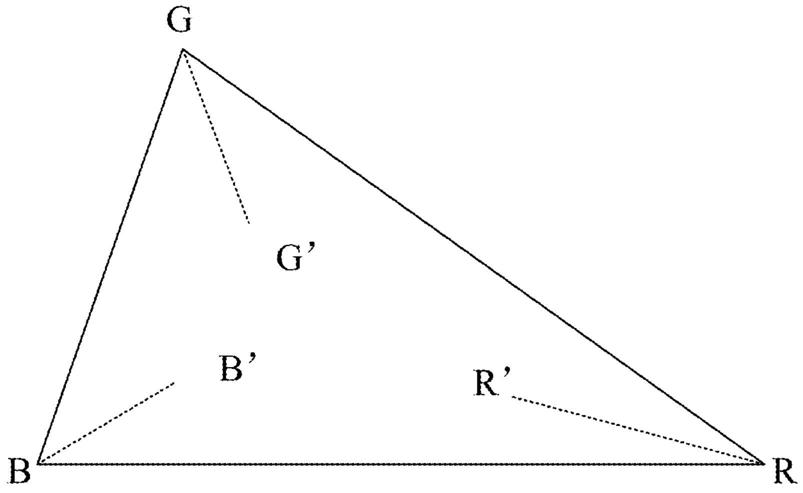
FIG. 32 is a schematic diagram of color coordinates according to an embodiment of the present disclosure.

In addition, it can be seen from the above equation that if Lr1:Lg1:Lb1=Lr2:Lg2:Lb2, the color coordinates of the white-points can be kept unchanged. FIG. 32 shows a schematic diagram of color coordinates, wherein the R, G and B are color coordinates of the corresponding colors in the time sequence diagram shown in FIG. 4. The R', G' and B' are the color coordinates of the corresponding colors in the time sequence diagram shown in FIG. 31. It can be further determined from FIG. 32 that the color coordinates of the three light-emitting elements L1 of the red, green and blue colors can be changed without changing the color coordinates of the white-points.

Figure 33:
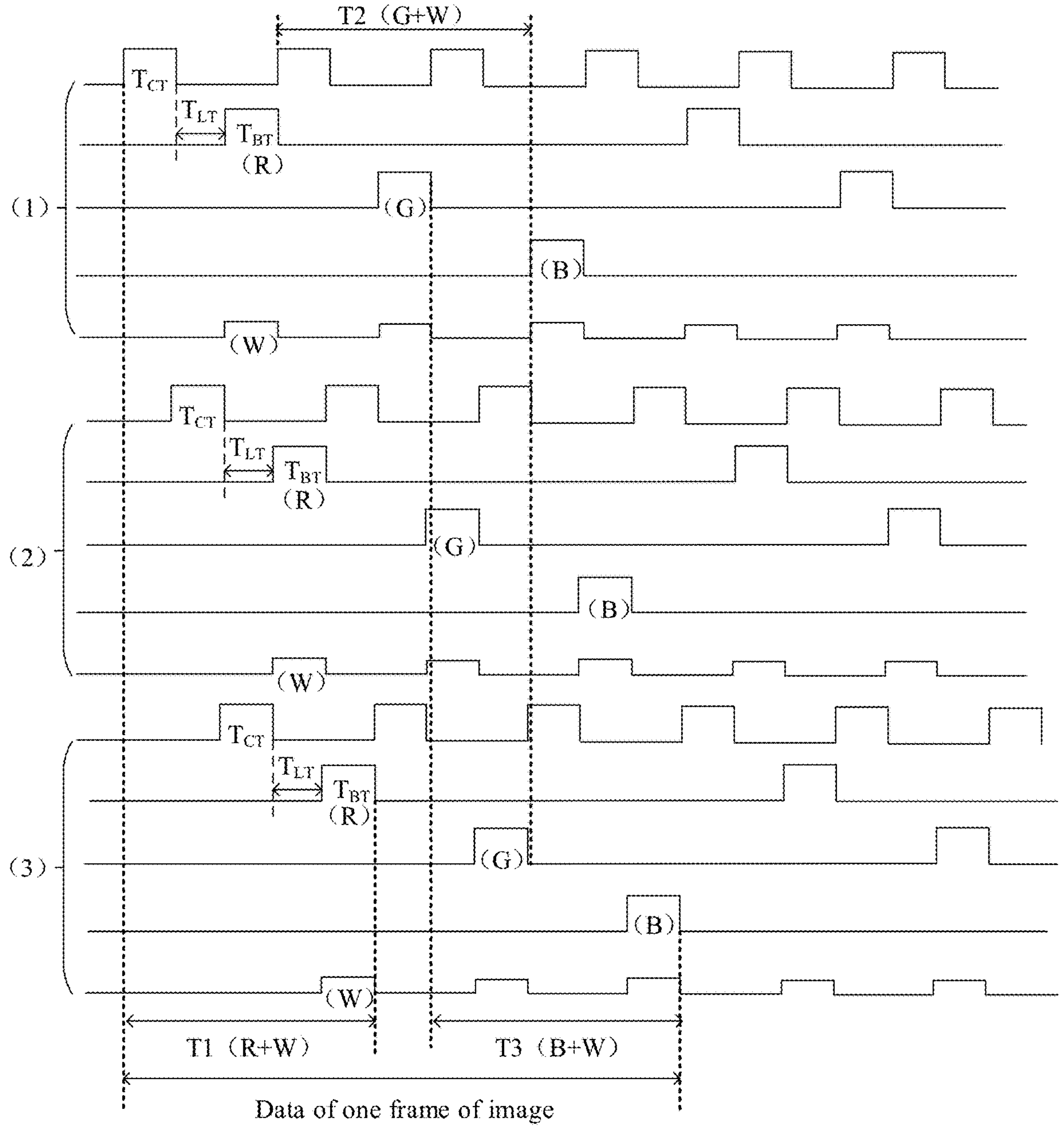
FIG. 33 is yet another driving time sequence diagram according to an embodiment of the present disclosure.

Another example is provided by taking the display module shown in FIG. 27 as an example, where the first color is red, the second color is green, the third color is blue, the fourth color is white; and in the case that the $i^{th}$ color is not white, the driving apparatus 30 is further configured to drive the white light-emitting element L1 included in each backlight source 101 to emit light in the $i^{th}$ driving process. FIG. 33 shows another driving time sequence diagram.

As shown in FIG. 33, the driving apparatus 30 may sequentially execute three driving processes T1, T2 and T3 after receiving data of one frame of image. It is assumed that the light-emitting elements L1 of the first color driven by the driving apparatus 30 in the first driving process T1 are red light-emitting elements, the light-emitting elements L1 of the second color driven by the driving apparatus 30 in the second driving process T2 are green light-emitting elements, and the light-emitting elements L1 of the third color driven by the driving apparatus 30 in the third driving process T3 is blue light-emitting elements. Referring to FIG. 33, in the first driving process T1, when driving the red light-emitting element L1 included in each backlight source 101 to emit light, the driving apparatus 30 may simultaneously drive the white light-emitting element L1 included in each backlight source 101 to emit light; in the second driving process T2, when driving the green light-emitting element L1 included in each backlight source 101 to emit light, the driving apparatus 30 may simultaneously drive the white light-emitting element L1 included in each backlight source 101 to emit light; and in the third driving process T3, when driving the blue light-emitting element L1 included in each backlight source 101 to emit light, the driving apparatus may simultaneously drive the white light-emitting element L1 included in each backlight source 101 to emit light. That is, the white color is added to the R picture, the white color is added to the G picture, and the white color is added to the B picture.

As described in the above embodiments, the luminance of the light-emitting element L1 may be positively correlated to the magnitude of a potential transmitted by the driving apparatus 30. In this way, it can be seen from FIG. 33 that in the first driving process T1, the potential transmitted by the driving apparatus 30 to the red light-emitting element L1 is greater than the potential transmitted by the driving apparatus 30 to the white light-emitting element L1. In this way, it is ensured that the luminance of the red light-emitting element L1 is higher than the luminance of the white light-emitting element L1 in the first driving process T1. The second driving process T2 and the third driving process T3 are similar to the first driving process T1, and these processes are not repeated here.

Therefore, it can be determined from the time sequence diagram shown in FIG. 33 that the display luminance Lu of one frame of image may meet the following equation:

$$Lu=(Lr+Lg+Lb)*T_{BT}+(Lwr+Lwg+Lwb)*T_{BT},$$

where Lr indicates the luminance of the red light-emitting element L1; Lwr indicates the luminance of the red light-emitting element L1 in the case that the white light-emitting element L1 is also driven to emit light when the red light-emitting element L1 is driven to emit light; Lg indicates the luminance of the green light-emitting element L1; Lwg indicates the luminance of the green light-emitting element L1 in the case that the white light-emitting element L1 is also driven to emit light when the green light-emitting element L1 is driven to emit light; Lb indicates the luminance of the blue light-emitting element L1; Lwb indicates the luminance of the blue light-emitting element L1 in the case that the white light-emitting element L1 is also driven to emit light when the blue light-emitting element L1 is driven to emit light. Therefore, it can be determined that the overall display light efficiency (i.e., luminous efficiency) can be improved by performing the driving and displaying according to the time sequence diagram shown in FIG. 33 and thus the display luminance can be effectively improved.

In addition, after the white color is added, the overall color coordinates of the white-point formed by each backlight source 101 may be: W+R+G+B, where R+G+B indicates the white-point color coordinates formed by a combination of R+G+B and may also be referred to as original white-point color coordinates. Therefore, if the coordinates of W are the same as the color coordinates formed by the combination of R+G+B, the overall coordinates of the white-point will not change; otherwise, it is necessary to change the color coordinates of the white-point according to the luminance and the coordinates of the white light-emitting element L1. Therefore, it can also be determined that as long as the W coordinates are the same as the color coordinates formed by the combination of R+G+B, the overall color coordinates of the white-point will not change regardless of whether Lwr, Lwg and Lwb are equal or not.

Figure 34:
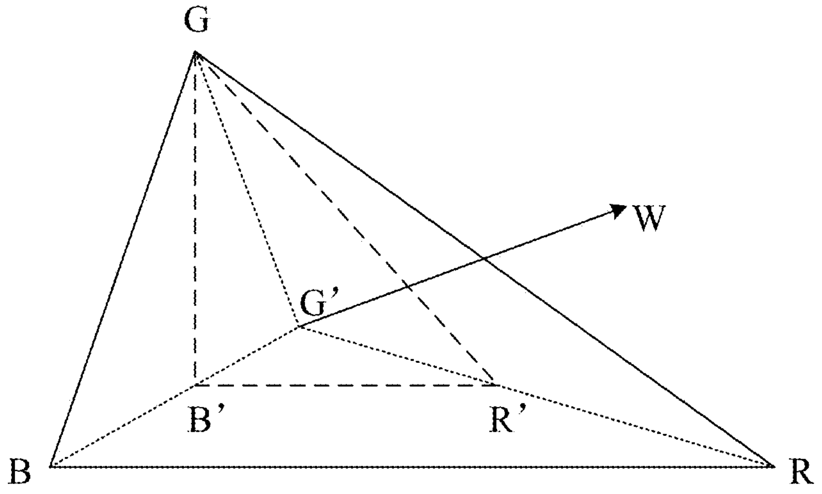
FIG. 34 is a schematic diagram of another type of color coordinates according to an embodiment of the present disclosure.

Optionally, FIG. 34 shows a schematic diagram of an optional arrangement of color coordinates of four light-emitting elements L1 included in each backlight source 101 according to the time sequence diagram as shown in FIG. 33. As can be seen from FIG. 15, when the white light-emitting element L1 is added, the color coordinates of R, G and B will be affected, but a dominant wavelength will not change. In addition, the color coordinates of R change to the extended lines of the color coordinates of W and R, and the offset is correlated with luminance.

Optionally, the display module described in the embodiments of the present disclosure may be a color-film-less head-up display (HUD) device. An HUD is a display module disposed in a vehicle, and thus may also be referred to as a vehicle-mounted HUD. The vehicle-mounted HUD is generally an augmented reality (AR)-HUD, and the AR-HUD may include picture generation units (PGU). In other words, the display module provided by the embodiments of the disclosure may be applied to the vehicle-mounted field, bringing an innovation to the vehicle-mounted field.

It should be noted that the current AR-HUD generally adopts a common conventional liquid crystal display (LCD) panel. A conventional LCD only has a transmittance of 8.5%, and the low luminance and high power consumption have become the bottleneck of its development. By adopting the color-film-less display panel provided by the embodiments of the present disclosure, not only can the transmittance of the display panel be effectively improved to about 20%, but also the display luminance can be higher and the power consumption can be lower. Optionally, the color-film-less display module described in the embodiments of the present disclosure may adopt a FOG screen, i.e., the color-film-less display module may be a FOG color-film-less display module. Compared with a FOG display module having a color film, the overall light transmittance of the color-film-less display module can be improved to about 3 times.

Figure 35:
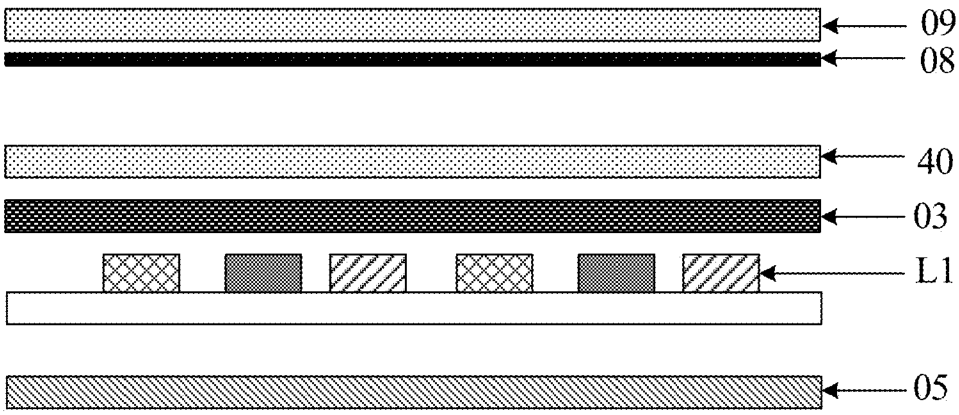
FIG. 35 is a schematic structural diagram of yet another display module according to an embodiment of the present disclosure.

FIG. 35 shows a schematic structural diagram of a FOG color-film-less display module. It can be seen by combining FIG. 30 and FIG. 35 that, in addition to the structures shown in FIG. 30, the display module may further include a gain film 08 and a FOG screen 09 that are stacked in sequence on the side of the light assigning assembly 40 distal from the backlight source. The gain film 08 may be made of a polarizing film material. By disposing the gain film 08, the light transmittance can be improved, unnecessary polarized light can be reflected, and heat damages of the light-emitting elements L1 to the LCD substrate can be reduced.

In some embodiments, the display module described in the embodiments of the present disclosure may also be applied to the field of other display technologies, e.g., the field of medical display technologies.

In addition, the refresh frequency of the display module described in the embodiments of the present disclosure may be 180 hertz (Hz). When the refresh frequency is high enough, human eyes will not recognize switching of different colors. Thus, changes in colors of the image can be realized by superimposing images having different grayscales. In some embodiments, the refresh frequency may be 60 Hz.

In summary, the embodiments of the present disclosure provide a display module which includes a color backlight module, a liquid crystal display panel and a driving apparatus. The liquid crystal display panel has a plurality of display subareas arranged along a column direction, and the color backlight module has a plurality of backlight subareas in a one-to-one correspondence to the plurality of display subareas and includes a plurality of backlight sources. As the driving apparatus is configured to sequentially drive liquid crystal molecules in the display subareas to turn over, and each time the liquid crystal molecules in each display subarea have been turned over, the driving apparatus is further configured to drive the light-emitting element of one color included in each backlight source in one corresponding backlight subarea to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

Figure 36:
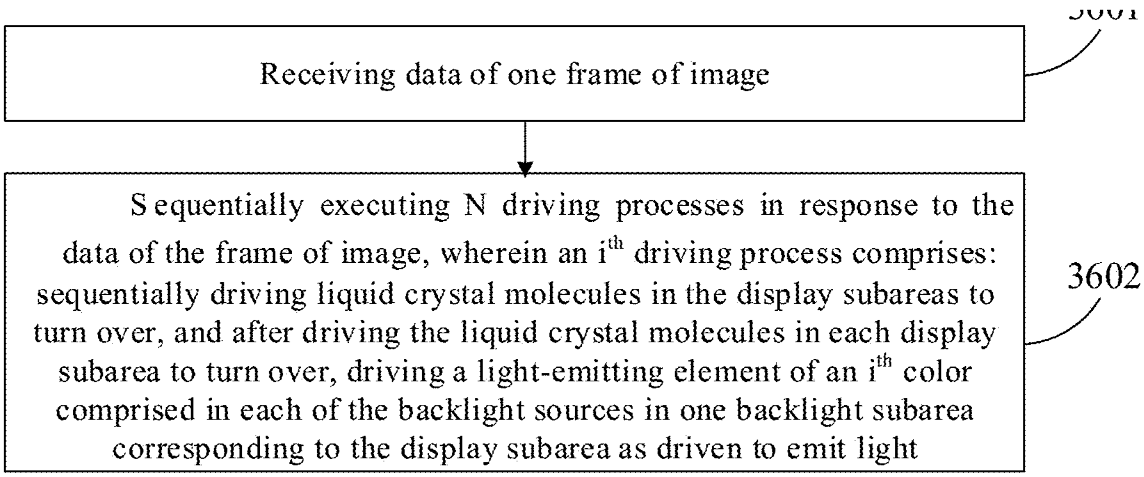
FIG. 36 is a flowchart showing a method of driving a display module according to an embodiment of the present disclosure.

FIG. 36 is a flowchart showing a method of driving a display module according to an embodiment of the present disclosure. The method may be configured to drive a display module shown in the above embodiments. As shown in FIG. 36, the method may include the following steps.

In step 3601, data of one frame of image is received.

In step 3602, N driving processes are sequentially executed in response to the data of the frame of image, and an $i^{th}$ driving process includes: sequentially driving liquid crystal molecules in display subareas to turn over, and after driving the liquid crystal molecules in each of the display subareas to turn over, driving a light-emitting element of an $i^{th}$ color included in each backlight source in one corresponding backlight subarea to emit light.

Optionally, N may be a positive integer greater than 1, and i may be a positive integer not greater than N.

In summary, the embodiments of the present disclosure provide a method of driving a display module. In the method, liquid crystal molecules in the display subareas are sequentially driven to turn over, and each time the liquid crystal molecules in each of the display subareas have been turned over, the light-emitting element of one color included in each backlight source in one corresponding backlight subarea is further driven to emit light, thereby effectively alleviating the phenomenon that the liquid crystal molecules cannot be turned over when the backlight sources are turned on. Therefore, the picture finally displayed by the display module would not have the color crosstalk defect, and the display module has an excellent display effect.

Optionally, a reference may be made to the above descriptions about the display module for other alternative implementations of step 3602, which are not repeated here.

Figure 37:
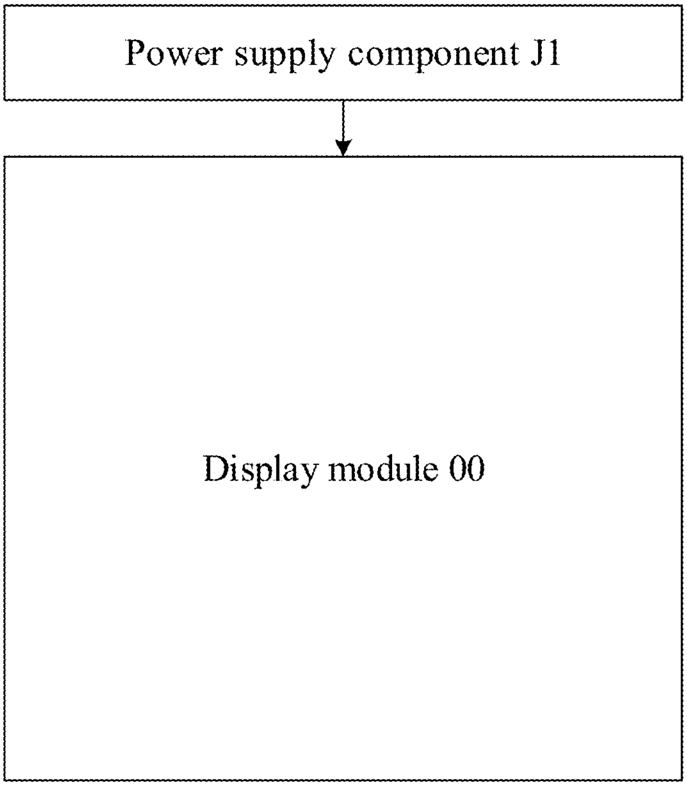
FIG. 37 is a schematic structural diagram of a display device according to an embodiment of the present disclosure.

FIG. 37 is a schematic structural diagram of a display device according to an embodiment of the present disclosure. As shown in FIG. 18, the display device may include a power supply component J1 and a display module 00 as shown in the above embodiments.

Here, the power supply component J1 may be connected to the display module 00, and configured to power the display module 00.

It should be understood that the terms "first" and "second" in the specification and claims of the embodiments of the present disclosure, as well as the above-mentioned accompanying drawings, are used to distinguish similar objects, but not used to describe a specific sequence or precedence. It should be understood that data used in this case can be interchanged under appropriate circumstances, for example, it can be implemented in a sequence other than those given in the illustrations or descriptions of the embodiments of the present disclosure.

The above descriptions are merely optional embodiments of the present disclosure, and are not intended to limit the present disclosure. Any modifications, equivalent substitutions, improvements, and the like made within the spirits and principles of the present disclosure shall all fall within the protection scope of the present disclosure.

What is claimed is:

1. A display module, comprising:

a color backlight module and a liquid crystal display module stacked in sequence, wherein the liquid crystal display module comprises a liquid crystal display panel having a plurality of display subareas arranged along a column direction, and the color backlight module has a plurality of backlight subareas in a one-to-one correspondence to the plurality of display subareas and comprises a plurality of backlight sources located in each of the backlight subareas, each of the backlight sources comprising light-emitting elements of N colors, N being a positive integer greater than 1; and a driving apparatus connected to the color backlight module and the liquid crystal display module respectively and configured to sequentially execute N driving processes in response to receiving data of one frame of image, wherein an $i^{th}$ driving process comprises:

sequentially driving the display subareas to switch from a non-light transmitting state to a light transmitting state, and after driving each display subarea to switch to the light transmitting state, driving a light-emitting element of an $i^{th}$ color comprised in each of the backlight sources in one backlight subarea corresponding to the display subarea as driven to emit light, i being a positive integer not greater than N;

wherein the display module further comprises a plurality of light assigning assemblies between the liquid crystal display module and the color backlight module, wherein each of the plurality of light assigning assemblies comprises a first end, a second end, and a body portion connecting the first end and the second end, wherein the first end is more distal from the liquid crystal display module than the second end, the plurality of backlight sources are disposed on the first ends of the plurality of light assigning assemblies, an orthogonal projection of each of the plurality of backlight sources on the liquid crystal display module is overlapped with an orthogonal projection of the corresponding light assigning assembly on the liquid crystal display module, and a light exiting face of each of the plurality of backlight sources faces towards the second end of the corresponding light assigning assembly.

2. The display module according to claim 1, wherein the plurality of light assigning assemblies are arranged in a one-to-one correspondence with the plurality of backlight sources, and the orthogonal projection of each of the plurality of backlight sources on the liquid crystal display module is within an orthogonal projection of the first end of the corresponding light assigning assembly on the liquid crystal display module.

3. The display module according to claim 2, wherein a center point of each of the plurality of backlight sources is overlapped with an axis line of the corresponding light assigning assembly.

4. The display module according to claim 1, wherein a size of the first end is less than a size of the second end, and at least one of the following requirements is met:

an orthogonal projection of the first end on the liquid crystal display module is within an orthogonal projection of the second end on the liquid crystal display module;

a center of the orthogonal projection of the first end on the liquid crystal display module is overlapped with a center of the orthogonal projection of the second end on the liquid crystal display module; and an orthogonal projection of an inner wall face of the body portion on the liquid crystal display module is within the orthogonal projection of the second end on the liquid crystal display module.

5. The display module according to claim 1, wherein the light assigning assembly comprises a reflective cup, wherein a cup body of the reflective cup is the body portion of the light assigning assembly, a lower opening of the reflective cup is the first end of the light assigning assembly, and an upper opening of the reflective cup is the second end of the light assigning assembly; wherein in a direction perpendicular to the liquid crystal display module, a distance between the lower opening of the reflective cup and the upper opening of the reflective cup is greater than or equal to 10 mm, and is less than or equal to 30 mm; and a plurality of reflective cups are an integrated structure, and an inner wall face of the cup body of the reflective cup comprises a plurality of wall sub-faces, wherein an included angle between two adjacent wall sub-faces is a chamfer.

6. The display module according to claim 1, wherein the light assigning assembly comprises a lens, wherein a lens body of the lens is the body portion of the light assigning assembly, a first end of the lens body is the first end of the light assigning assembly, a second end of the lens body is the second end of the light assigning assembly, and the lens body is a conical shell comprising a cavity;

the cavity of the lens body is provided with a first quadric surface, an inner wall of the lens body is provided with a second quadric surface, wherein the first quadric surface is convex toward the first end of the lens body, and the second quadric surface is convex toward the second end of the lens body;

light from the backlight source within a first incidence angle range is collimated and emitted from the second end of the lens body upon being refracted by the first quadric surface, and incidence light from the backlight source within a second incidence angle range is collimated and emitted from the second end of the lens body upon being refracted by the second quadric surface; a maximum angle within the first incidence angle range is less than a minimum angle within the second incidence angle range, and the first incidence angle range is an incidence angle range of light from the backlight source directly emitted from the second end of the lens body without being reflected by the inner wall of the lens body.

7. The display module according to claim 6, wherein the cavity of the lens body is provided with a third quadric surface, wherein the third quadric surface is convex toward the second end of the lens body and is disposed on a side, distal from the first end of the lens body, of the first quadric surface, and an orthogonal projection of the third quadric surface on the liquid crystal display module is overlapped with an orthogonal projection of the first quadric surface on the liquid crystal display module, wherein the light from the backlight source within the first incidence angle range is collimated and emitted from the second end of the lens body through the third quadric surface upon being refracted by the first quadric surface;

wherein each the first quadric surface, the second quadric surface, the third quadric surface comprises any one of a spherical face, an ellipsoidal spherical face, and an ellipsoidal paraboloid face.

8. The display module according to claim 7, wherein the orthogonal projection of the third quadric surface on the liquid crystal display module covers the orthogonal projection of the first quadric surface on the liquid crystal display module.

9. The display module according to claim 8, wherein the lens comprises a first curved lens, a first fixed cavity, a second curved lens, and a second fixed cavity, wherein a first end of the first fixed cavity is affixed on the first end of the lens body, the first curved lens is affixed on a second end of the first fixed cavity, and a convex surface of the first curved lens forms the first quadric surface; and a first end of the second fixed cavity is affixed on the second end of the lens body, the second curved lens is affixed on a second end of the second fixed cavity, and a convex surface of the second curved lens forms the third quadric surface.

10. The display module according to claim 7, wherein at least one of the following requirements is met:

both a focus of the first quadric surface and a focus of a third quadric surface are on a side of a second face of the backlight source, wherein the second face of the backlight source is the light exiting face of the backlight source; and the second quadric surface surrounds the backlight source, and a focus of the second quadric surface is on a side of a first face of the backlight source, wherein the first face of the backlight source is a face opposite to the light exiting face of the backlight source.

11. The display module according to claim 10, wherein at least one of the following requirements is met:

a first distance between the focus of the second quadric surface and the backlight source ranges from 1 mm to 4 mm;

a second distance between the focus of the first quadric surface and the second face of the backlight source is greater than one-third of a distance between the first end of the lend body and the second end of the lens body; and a third distance between a focus of the third quadric surface and the second face of the backlight source is greater than half of the distance between the first end of the lend body and the second end of the lens body, and a distance between the third quadric surface and the second end of the lens body is less than a distance between the first quadric surface and the first end of the lens body.

12. The display module according to claim 1, wherein the driving apparatus is further configured to:

drive at least one light-emitting element of a different color than the $i^{th}$ color in each of the backlight sources to emit light in the $i^{th}$ driving process, wherein a luminance of the light-emitting element of the $i^{th}$ color is higher than a luminance of the at least one light-emitting element of the different color.

13. The display module according to claim 1, wherein the driving apparatus is further configured to:

drive each light-emitting element of a different color than the $i^{th}$ color in each of the backlight sources to emit light in the $i^{th}$ driving process, wherein a luminance of the light-emitting element of the $i^{th}$ color is higher than a luminance of each light-emitting element of the different color.

14. The display module according to claim 1, wherein each of the backlight sources comprises a light-emitting element of a first color, a light-emitting element of a second color and a light-emitting element of a third color; and the three light-emitting elements in each of the backlight sources are arranged in a triangle pattern, and any two adjacent light-emitting elements in each of the backlight subareas are of different colors.

15. The display module according to claim 12, wherein each of the backlight sources further comprises a light-emitting element of a fourth color; and the four light-emitting elements in each of the backlight source are arranged in a rectangle pattern, and any two adjacent light-emitting elements in each of the backlight subareas are of different colors.

16. The display module according to claim 15, wherein the first color is red, the second color is green, the third color is blue, and the fourth color is white; and in a case that the $i^{th}$ color is not white, the driving apparatus is further configured to drive a white light-emitting element comprised in each of the backlight sources to emit light in the $i^{th}$ driving process.

17. The display module according to claim 1, wherein the light-emitting elements of N colors in each of the backlight sources is integrated in a same chip.

18. The display module according to claim 1, further comprising:

a gain film disposed on a side of the plurality of light assigning assemblies distal from the backlight sources; and a fog screen disposed on a side of the gain film distal from the plurality of light assigning assemblies.

19. The display module according to claim 1, wherein the driving apparatus comprises a processing circuit, a control circuit, a backlight driving circuit and a power supply circuit, and the liquid crystal display module further comprises a display panel driving circuit;

the processing circuit is respectively connected to the display panel driving circuit and the control circuit, and configured to receive image data and to transmit an initial driving signal to the display panel driving circuit and the control circuit based on the image data;

the display panel driving circuit is further connected to the liquid crystal display panel and configured to drive the display subareas to switch from the non-light transmitting state to the light transmitting state;

the control circuit is further connected to the backlight driving circuit and configured to transmit a backlight driving signal to the backlight driving circuit under the control of the initial driving signal;

the backlight driving circuit is further connected to the color backlight module and configured to drive the backlight sources comprised in the color backlight module to emit light under a control of the backlight driving signal; and the power supply circuit is connected to the color backlight module and configured to power the color backlight module.

20. A display device, comprising: a power supply component and a display module; the power supply component is connected to the display module and configured to power the display module; and the display module comprises:

a color backlight module and a liquid crystal display module stacked in sequence, wherein the liquid crystal display module comprises a liquid crystal display panel having a plurality of display subareas arranged along a column direction, and the color backlight module has a plurality of backlight subareas in a one-to-one correspondence to the plurality of display subareas and comprises a plurality of backlight sources located in each of the backlight subareas, each of the backlight sources comprising light-emitting elements of N colors, N being a positive integer greater than 1; and a driving apparatus connected to the color backlight module and the liquid crystal display module respectively and configured to sequentially execute N driving processes in response to receiving data of one frame of image, wherein an $i^{th}$ driving process comprises:

sequentially driving the display subareas to switch from a non-light transmitting state to a light transmitting state, and after driving each display subarea to switch to the light transmitting state, driving a light-emitting element of an $i^{th}$ color comprised in each of the backlight sources in one backlight subarea corresponding to the display subarea as driven to emit light, i being a positive integer not greater than N;

wherein the display module further comprises a plurality of light assigning assemblies between the liquid crystal display module and the color backlight module, wherein each of the plurality of light assigning assemblies comprises a first end, a second end, and a body portion connecting the first end and the second end, wherein the first end is more distal from the liquid crystal display module than the second end, the plurality of backlight sources are disposed on the first ends of the plurality of light assigning assemblies, an orthogonal projection of each of the plurality of backlight sources on the liquid crystal display module is overlapped with an orthogonal projection of a corresponding light assigning assembly on the liquid crystal display module, and a light exiting face of each of the plurality of backlight sources faces towards the second end of the corresponding light assigning assembly.

* * * * *